United States Patent
Sunaga et al.

[11] Patent Number: 5,902,180
[45] Date of Patent: May 11, 1999

[54] VEHICLE AIR-CONDITIONING SYSTEM

[75] Inventors: Hideki Sunaga; Tsuneaki Odai; Masatoshi Suto, all of Tokyo, Japan

[73] Assignee: Calsonic Corporation, Tokyo, Japan

[21] Appl. No.: 08/957,019

[22] Filed: Oct. 24, 1997

[30] Foreign Application Priority Data

Oct. 25, 1996 [JP] Japan .................................... 8-284116
Nov. 14, 1996 [JP] Japan .................................... 8-318627
Nov. 18, 1996 [JP] Japan .................................... 8-306300

[51] Int. Cl.$^6$ .................................................. B60H 1/26
[52] U.S. Cl. ............................................ 454/69; 454/121
[58] Field of Search ............................ 454/69, 121, 156, 454/159, 160, 161

[56] References Cited

U.S. PATENT DOCUMENTS 4,840,308 6/1989 Akabane et al. ...................... 165/43 X
5,803,355 9/1998 Urreshino et al. .................... 454/75 X
5,823,868 10/1998 Ohkubo et al. ......................... 454/121

FOREIGN PATENT DOCUMENTS 62-234716 10/1987 Japan .................................... 454/156

Primary Examiner—Harold Joyce
Attorney, Agent, or Firm—Sughrue, Mion, Zinn, Macpeak & Seas, PLLC

[57] ABSTRACT

A vehicle air-conditioning system includes an air-conditioning amplifier unit being connected to a plurality of door actuators through one communication and one power line; and the air-conditioning amplifier unit having first door-operation self-diagnostic means which sends to the door actuator target stopping position data for bringing doors in a full-open condition or full-close condition; if there is a change in an instruction value, after the lapse of a preset period of time which takes into account the time period required for the door to arrive at a target position and a lag in communication, the self-diagnostic means determining that the doors are in a normal condition when the signal returned from the door actuator represents that the doors are in a stopped state but determining that the doors are in an abnormal condition when the signal represents that the doors are in an actuated state.

12 Claims, 20 Drawing Sheets

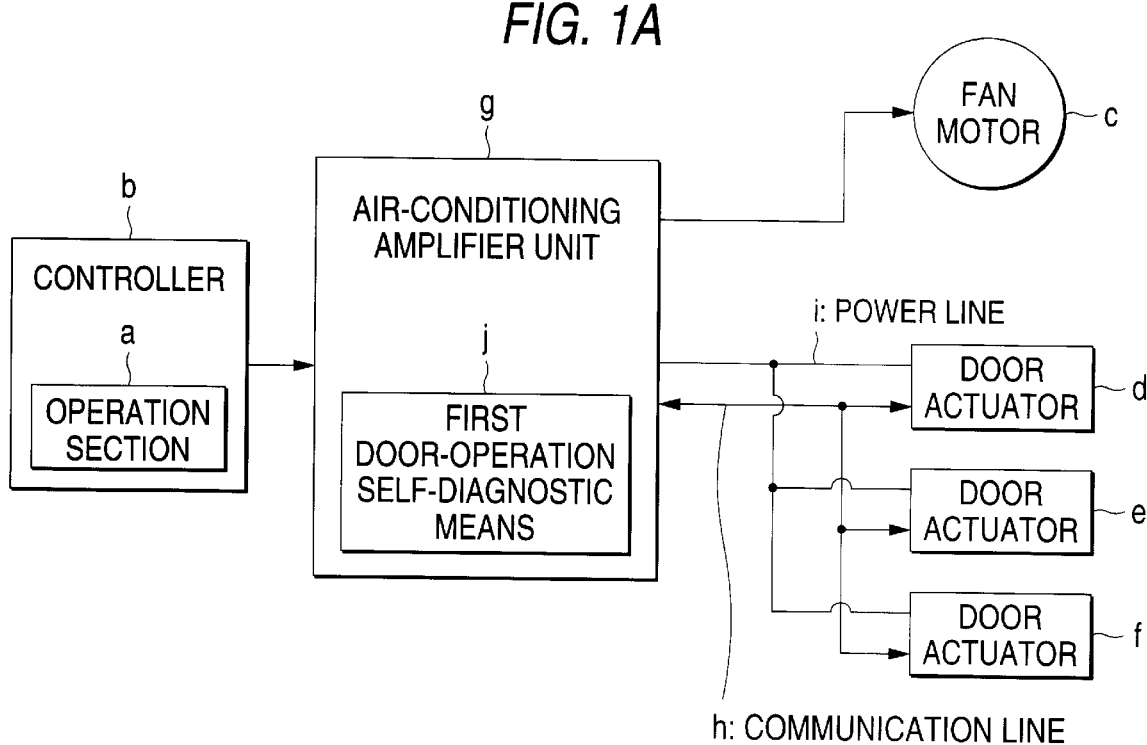
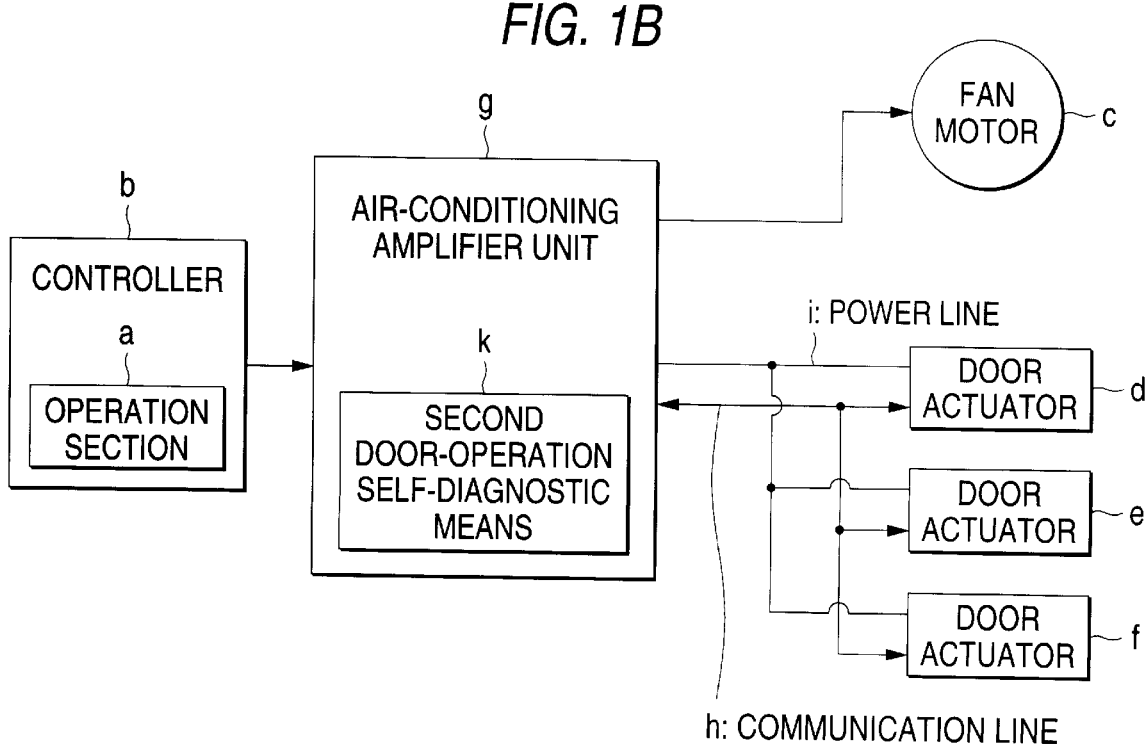

FIG. 6A
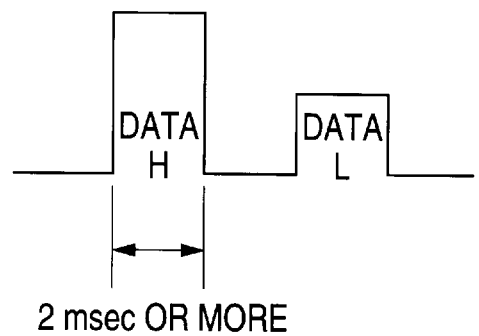
2 msec OR MORE
FIG. 6B
| CODE | | WAVEFORM |
|---|---|---|
| HIGH-ORDER bit | LOW-ORDER bit | |
| SOM | | HLLL |
| 0 | 0 | HHH |
| 0 | 1 | HLH |
| 1 | 0 | HHL |
| 1 | 1 | HLL |
FIG. 7
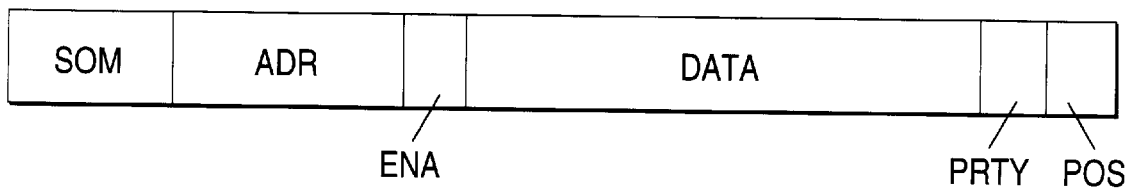

VEHICLE AIR-CONDITIONING SYSTEM

BACKGROUND OF THE INVENTION

1. Field of the Invention

The present invention relates to a vehicle air-conditioning system which connects, in the form of a local area network (hereinafter referred to as a LAN), an air-conditioning control unit to door actuators and controls the opening of doors through use of a target door opening, and more particularly, to a local-area-networked vehicle air-conditioning system equipped with the feature of self-diagnosing the door actuators.

2. Description of the Conventional Art

In an existing vehicle air-conditioning system equipped with a microcomputer, an intake door, an air mixing door, and a mode door are automatically controlled so as to open and close on the basis of a target opening signal calculated by the microcomputer by means of an electrically-driven actuators. At this time, in order to feed back an actual degree of opening of each door to the microcomputer, a rotational position signal is output from the electrically-driven actuator to the microcomputer. To transmit and receive such a control signal, it is necessary to electrically connect the microcomputer incorporated in an amplifier unit to the electrically-driven actuators mounted on an air-conditioning unit by means of tens of wiring harnesses. Further, the opening position required for each door becomes different for each of the intake door, the mixing door, and the mode door. Accordingly, an electrically-driven actuator whose actuation method is suitable for each door is used, thereby making it difficult to share the same actuator among doors.

For these reasons, data communication between the air-conditioning amplifier and the electrically-driven actuators is configured in a local area network to thereby reduce the number of wiring harnesses serving as transmission mediums and to integrate the electrically-driven actuators. In this type of local-area-networked vehicle air-conditioning system, the electrically-driven actuator is equipped with an IC chip which constitutes a signal processing circuit, and data are exchanged between the IC chip and the microcomputer of the amplifier unit. The feedback on the actual door opening is processed by an electronic circuit including the IC chip of the electrically-driven actuator, thereby enabling a reduction in the number of wiring harnesses. Further, this electronic circuit can control an opening position of each door, thereby enabling the electrically-driven actuator to be shared between the doors.

The existing vehicle air-conditioning system equipped with a microcomputer has a so-called self-diagnostics for checking whether or not the electrically-driven actuators are properly actuated. If any problem arises, the problem can be indicated on a monitor, or the like, by checking the operations of the electrically-driven actuators by means of the microcomputer, because the data concerning the electrically-driven actuators, such as position signals required for self-diagnostics, are all transmitted to the microcomputer as a return signal, and all the data are processed by the microcomputer.

However, in the aforementioned local-area-networked vehicle air-conditioning system, since-there is no need to feed back the position signals from the electrically-driven actuators to the microcomputer, the length of the data in the return signal transmitted to the microcomputer from the actuators has only 1 bit which represents whether the electrically-driven actuator is in operation (in a high state; Hi) or under suspension (in a low state; Lo).

As a result, even in a state where a high-level signal is being transmitted to the microcomputer, it is impossible for the microcomputer to know whether or not the electrically-driven actuator is properly operating or in a motor-locked state. Further, even in a state where a low-level signal is being transmitted to the microcomputer, it is impossible for the microcomputer to know whether the electrically-driven actuator is properly operating or stopped due to a communications error.

Further, if the return signal is simply checked in terms of the commencement of action of the door without taking into consideration the check timing corresponding to a change in an instructed degree of door opening, it will be falsely determined whether the door is actuated normally or abnormally.

More specifically, since the communication data including the return signal are sequentially sent in accordance with predetermined rotation, if there is a change in an instruction value of the data (target position of the door), the commencement of operation of the actuator will lag behind the changed instruction value. Further, the output of the return signal representing the operation of the actuator lags behind the actual commencement of operation of the actuator. Particularly, the lag time becomes longer with an increase in the number of door actuators.

These problems can be solved by only increasing the area of data in a communications frame format related to the operation of the electrically-driven actuator. However, such an increase in the data area results in a reduction in another data area related to; e.g., a target door opening signal.

SUMMARY OF THE INVENTION

The object of the present invention is to provide a door-operation self-diagnostic apparatus for use with a vehicle air-conditioning system which controllably actuates a plurality of door actuators, the apparatus being capable of determining whether a door operates normally or abnormally through use of a return signal representing the stop and operation of the door while the weight and cost of the system are reduced by configuring an air-conditioning amplifier and actuators in a LAN. Further, there is provided a function to determine errors in communication with the door-operation self-diagnostic apparatus in the present invention, if there is a grounded short circuit in a communication, for determining errors in communication.

As shown in FIG. 1A representing the configuration of the features of one embodiment of the invention for solving the foregoing problems is directed to a vehicle air-conditioning system including a controller "b" which has an operation section "a" provided with switches, such as mode switches and a temperature control dial, and an air-conditioning amplifier unit "g" which arithmetically processes input signals received from the switches or sensors according to program software by means of a built-in microcomputer and controllably actuate a fan motor "c" provided in the air-conditioning system and a plurality of actuators "d," "e," and "f," the vehicle air-conditioning system comprising: the air-conditioning amplifier unit "g" being connected to the plurality of door actuators "d," "e," and "f" through one communication "h" and one power line "i"; the air-conditioning amplifier unit "g" having first door-operation self-diagnostic means "j" which sends to the door actuator "d" target stopping position data for bringing the door in a full-open condition or full-close condition; if there is a change in an instruction value, after the lapse of a preset time period which takes into account the time period required for the door to arrive at a target position and a lag in communication, the self-diagnostic means "j" determining that the doors are in a normal condition when the signal returned from the door actuator "d" represents that the doors are in a stopped state but determining that the doors are in an abnormal condition when the signal represents that the doors are in an actuated state.

In the above vehicle air-conditioning system, the doors to be subjected to self-diagnostics by the first door-operation self-diagnostic means "j" are actuated at least between two conditions; i.e., a full-open state and a full-close state; and the first door-operation self-diagnostic means "j" determines whether the doors are actuated normally or abnormally with regard to each of the full-open state and the full-close state.

As shown in FIG. 1B representing the configuration of the features of one embodiment of the invention for solving the foregoing problems is directed to a vehicle air-conditioning system including a controller "b" which has an operation section "a" provided with switches, such as mode switches and a temperature control dial, and an air-conditioning amplifier unit "g" which arithmetically processes input signals received from the switches or sensors according to program software by means of a built-in microcomputer and controllably actuate a fan motor "c" provided in the air-conditioning system and a plurality of actuators "d," "e," and "f," the vehicle air-conditioning system comprising: the air-conditioning amplifier unit "g" being connected to the plurality of door actuators "d," "e," and "f" through one communication "h" and one power line "i"; the air-conditioning amplifier unit "g" having second door-operation self-diagnostic means "k" which sends an instruction for sequentially changing a mode in the order in which the door actuator "f" stops at intermediate stopping positions; in an initial mode, the second door-operation self-diagnostic means "k" waiting for the lapse of a first long preset time period which takes into account the time period required for the door received an instruction value to arrive at a target position and a lag in communication; in the modes subsequent to the initial mode, the second door-operation self-diagnostic means "k" waiting for the lapse of a second short preset time period which takes into account the time period required for the door to arrive at the adjacent intermediate position and a lag in communication; the second door-operation self-diagnostic means "k" determining that the door is in a normal condition when the signal returned from the door actuator "f" represents that the door is in a stopped state but determining that the door is in an abnormal condition when the signal represents that the door is in an actuated state.

In the vehicle air-conditioning system described above, the door to be subjected to self-diagnostics is a mode actuator which stops at intermediate stopping positions corresponding to a plurality of modes between a ventilation mode and a defroster mode; and the second door-operation self-diagnostic means "k" is arranged so as to perform second checking operation of sequentially changing modes in the reverse direction after the completion of first checking operation of sequentially changing the modes.

As shown in FIG. 15A representing the configuration of the features of one embodiment of the invention for solving the foregoing problems is directed to a vehicle air-conditioning system including a communications frame format which sequentially sends an instruction value, such as target door stopping position data, to each of the door actuators "d," "e," and "f" from the air-conditioning amplifier unit "g" via the communication "h," the data to be transmitted included in the format being additionally provided with a return signal which represents the actuation of the door actuators "d," "e," and "f" when the signal is in a high state but represents the stop of the door actuators "d," "e," and "f" when the signal is in a low state; the air-conditioning amplifier unit "g" having self-diagnostics means "j" which changes the instruction value sent to the door actuators "d," "e," and "f" from the air-conditioning amplifier unit "g" and checks the signals returned from the actuators "d," "e," and "f" after the lapse of delay time; if the return signals are in a low state, the self-diagnostics means "j" determining the actuators to be in a normal state; but if the return signals are in a high state, the self-diagnostics means "j" determining the actuators to be in an abnormal state; and the air-conditioning amplifier unit "g" having first communications error determination means "k" the first communications error determination means "k" comparing the data which the air-conditioning amplifier unit "g" output with the data received by the air-conditioning amplifier unit "g"; if the received data corresponding to the transmitted data in a high state are in a low state, the first communications error determination means "k" determining that there is an error in communication due to grounded short circuit.

In the vehicle air-conditioning system described above, the air-conditioning amplifier unit "g" may have second communications error determination means "m" in place of the first communications error determination means "k," and the second communications error determination means "m" commences the checking of the return signals at the point in time when the instruction value sent to the door actuators "d," "e," and "f" from the air-conditioning amplifier unit "g" is changed and, if the return signals do not go high but still remain in a low state even after the lapse of a preset period of time, determines that there is an error in communication due to grounded short circuit.

Further, to accomplish the foregoing object, the present invention provides a vehicle air-conditioning system shown in FIG. 20, including: target door opening determination means (51) which decides a target door opening determined by the arithmetic processing of inputs from switches and sensors through use of a microcomputer; and an actuator (21) having signal processing means (21c) which receives data concerning the target door opening decided by the target door opening determination means (51) and actuates a door in such a way that an actually-detected degree of door opening matches a target door opening, the actuator outputting operation and stop signals thereof, the improvement comprising: self-diagnostic means (52) which outputs to the actuator a diagnostic operation signal for actuating the door and diagnoses a problem in the actuator on the basis of the presence/absence of the operation and stop signals received from the actuator in response to the diagnostic operation signal.

In the above vehicle air-conditioning system, the data output from the actuators comprises two types of signals; i.e., an operation signal and a stop signal of the actuator, it is impossible to diagnose the operation of the actuators solely by means of these signals. A problem of the actuator can be diagnosed by detecting the presence or absence of a response signal output in response to a diagnostic operation signal for actuating a door output from the self-diagnostic means to the actuator.

More specifically, when the self-diagnostic means outputs a diagnostic operation signal to the actuator, the actuator commences the actuation of a door to the degree of door opening corresponding to the diagnostic operation signal and stops the door at the door opening position corresponding to the diagnostic operation signal. Accordingly, so long as the actuator is normal, upon receipt of the diagnostic operation signal, the actuator is supposed to initially output an operation signal, as well as to output a stop signal after the lapse of a given period of time.

By utilization of such a chain of cause-and-effect relations between the operation signal and the response signal, even in a case where only two types of signals are output from the actuator, a problem of the actuator can be diagnosed by means of these output signals.

The actuator employed in the present invention comprises all types of actuators used in a vehicle air-conditioning system; e.g., an intake door actuator, an air mixing door actuator, a mode door actuator, as well as auxiliary door actuators such as bypass door actuators. The present invention is not limited to any specific type of door actuator.

In the case of an actuator for use with an intake door, a bypass door or a mode door, the degree of door opening selected by a passenger is predominantly sent to the actuator exactly as a target door opening. After an actual degree of door opening has been compared with the target door opening, the door is actuated. If an automatic control mode is selected, the target door opening for the actuator may be calculated from the temperature selected by the passenger on the basis of a preset program, and the thus-calculated target door opening may be determined.

In the case of an air mixing door actuator, in order to precisely control the door opening, it is desirable to initially calculate a temperature deviation between the preset temperature and the temperature of the passenger compartment at the time of determination of a target door opening, in consideration of factors which would affect the compartment temperature, and the target door opening is determined on the basis of the thus-obtained temperature deviation. However, the present invention is not limited to the foregoing manner of determination of the target door opening.

The present invention is particularly desirable for use in a vehicle air-conditioning system, in which an air-conditioning control unit outputs to an actuator an operation signal for actuating a door to a target door opening, and signal processing is performed so as to match the degree of door opening actually detected by the actuator with the target door opening. The present invention is particularly desirable for use in a vehicle air-conditioning system, in which the data sent to the air-conditioning control unit from the actuator predominantly comprises an operation signal and a stop signal alone. In this type of vehicle air-conditioning system, the actual opening data that are detected by the actuator and are suitable for use in diagnosing a problem are processed by the actuator, and there is no need to transmit the data to the air-conditioning control unit. The air-conditioning control unit only requires the operation signal and the stop signal. Consequently, the present invention allows a problem of the actuator to be diagnosed by use of 1 bit of data without use of the data designed specifically for diagnostics purposes.

The self-diagnostics procedures executed by the self-diagnostic means in the vehicle air-conditioning system according to the present invention can be embodied, as follows.

First, the self-diagnostic means executes a first self-diagnostic procedure; namely, outputs to the actuator a diagnostic operation signal for actuating the door in one direction; (A) determines the actuator to be normal when it receives the operation signal from the actuator in response to the diagnostic operation signal and further receives the stop signal from the actuator after lapse of a given period of time;

(B) determines the actuator to be in a motor-locked state when it receives the operation signal from the actuator in response to the diagnostic operation signal but fails to receive the stop signal from the actuator even after the lapse of a given period of time; and (C) determines the actuator to be in an abnormal communication state when it fails to receive the stop signal from the actuator in response to the diagnostic operation signal.

More specifically, when the self-diagnostic means outputs the diagnostic operation signal to the actuator, the actuator commences the actuation of a door to the degree of door opening corresponding to the diagnostic operation signal and stops the door at the door opening position corresponding to the diagnostic operation signal. In other words, so long as the actuator is normal, upon receipt of the diagnostic operation signal, the actuator is supposed to initially output the operation signal, as well as to output the stop signal after the lapse of a given period of time. Consequently, as described in subsection (A), the self-diagnostic means determines the actuator to be in a "normal state."

Although the actuator commences the actuation of the door when receiving the diagnostic operation signal, if the stop signal is not output from the actuator even after the lapse of a given period of time, the actuator is considered to be in operation or in a motor-locked state where the door is closed but an electrical current is supplied to the motor. Accordingly, provided that the time period required for the door to operate in response to the diagnostic operation signal is set to a given period of time, if the stop signal is output from the actuator even after the lapse of a given period of time, there is no alternative way but to think that the actuator is in a motor-locked state. Consequently, the self-diagnostic means determines the actuator to be in a "motor-locked state," as described in subsection (B).

In a case where the actuator has received the diagnostic operation signal but fails to output the operation signal, there is no alternative way but to think that there arises a communication failure. Therefore, the self-diagnostic means determines the actuator to be in an "abnormal communication state," as described in subsection (C).

Since the aforementioned first self-diagnostic procedure contributes to the simplification of a program, there is required only a small program storage area, and the diagnostics can be executed in a short period of time.

Next, the self-diagnostic means executes a second self-diagnostic procedure; namely, outputs to the actuator a first diagnostic operation signal for actuating the door in one direction and then outputs to the actuator a second diagnostic operation signal for actuating the door in the other direction; (A) determines the actuator is normal when it receives the operation signal received from the actuator in response to the first diagnostic operation signal; receives the stop signal from the actuator after the lapse of a given period of time; receives the operation signal from the actuator in response to the second diagnostic operation signal; and receives the stop signal from the actuator after the lapse of a given period of time; (B) determines the actuator to be in a motor-locked state when it receives the operation signal from the actuator in response to the first diagnostic operation signal but fails to receive the stop signal from the actuator even after the lapse of a given period of time; or when it receives the operation signal from the actuator in response to the second diagnostic operation signal but fails to receive the stop signal from the actuator even after the lapse of a given period of time; and (C) determines the actuator to be in an abnormal communication state when it fails to receive the operation signal from the actuator in response to the first diagnostic operation signal; or when it fails to receive the operation signal from the actuator in response to the second diagnostic operation signal.

In short, the first self-diagnostic procedure is repeated several times.

In this case, preferably, the diagnostic operation signals sent to the actuators differ from each other with regard to the degree of door opening. Although it is possible to sufficiently determine a problem of the actuator by means of the first self-diagnostic procedure, there may arise a case where the actuator stays in its position, exactly as it is, without performing any operations if there is a coincidental match between the diagnostic operation signal sent to the actuator from the self-diagnostic means and the actual degree of opening of the door. For this reason, although this case rarely occurs, it is possible to ensure the operation of the actuator even in this case by sending, several times, the diagnostic operation signals differing from each other with regard to the degree of door opening, thereby resulting in a further improvement in the accuracy of self-diagnostics.

In the present invention, it is desirable to indicate on display means the diagnostic result output from the self-diagnostic means so as to induce the passengers to pay attention to the diagnostic result. As a result, a trouble of the air-conditioning which would otherwise be caused by the problem of the actuator can averted.

BRIEF DESCRIPTION OF THE DRAWINGS

In the accompanying drawings:

FIGS. 1A and 1B are block diagrams which correspond to an illustrate a self-diagnostic apparatus for diagnosing the operations of doors in a vehicle air-conditioning system according to the present invention;

FIG. 6A is a schematic representation showing a communications waveform, and FIG. 6B is an encoding table;

FIG. 7 is a schematic representation showing a communications frame format used in data communication;

DETAILED DESCRIPTION OF THE PREFERRED EMBODIMENTS

1st Embodiment

First, the configuration of the self-diagnostic apparatus according to a first embodiment of the present invention will be described.

Figure 2:
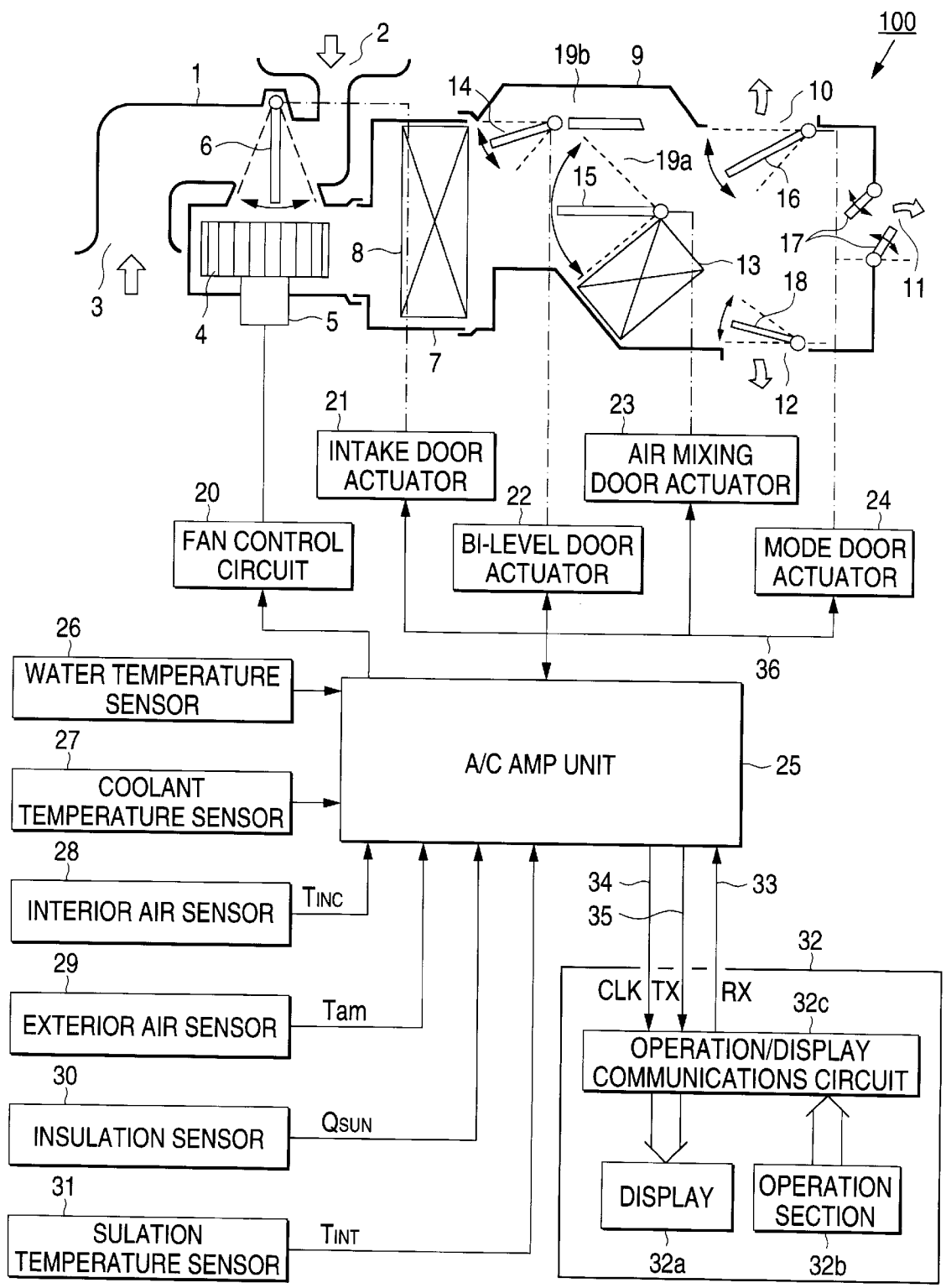
FIG. 2 is a general view showing a vehicle air-conditioning system to which the door-operation self-diagnostic apparatus according to a first embodiment is applied.

FIG. 2 is a schematic diagram showing a vehicle air-conditioning system 100 to which the door-operation self-diagnostic apparatus according to the first embodiment is applied.

As shown in an upper portion in FIG. 2, a mechanical system of the air-conditioning system 100 comprises an intake unit case 1, an external air inlet port 2, an interior air inlet port 3, a blower fan 4, a blower fan motor 5, an intake door 6, a cleaning unit case 7, an evaporator 8, a heater unit case 9, a vent hole 10, a defroster vent 11, a foot vent 12, a heater core 13, a bi-level door 14, a mixing door 15, a vent door 16, a defroster door 17, and a foot door 18.

The bi-level door 14 is disposed in a by-pass channel 19b which is a detour around an air flow channel 19a where the heater core 13 is disposed via the mixing door 15 and guides the cool air output from the evaporator 7 to the vent hole 10.

As shown in a lower portion in FIG. 2, a control system of the air-conditioning system comprises a fan control circuit 20, an intake door actuator 21, a bi-level door actuator 22, an air mixing door actuator 23, a mode door actuator 24, an air-conditioning amplifier unit 25, a water temperature gauge 26, a coolant temperature sensor 27, an interior air sensor 28, an exterior air sensor 29, an insolation sensor 30, a suction temperature sensor 31, and a controller 32.

The fan control circuit 20 controls a voltage applied to the blower fan motor 5 in a stepless manner according to an instruction from the air-conditioning amplifier unit 25.

The air-conditioning amplifier unit 25 decides the degree of opening (interior air, semi-exterior air, exterior air), and the intake door actuator 21 actuates the intake door 6 to the thus-decided degree of door opening.

In a case where the degree of opening of the mixing door 15 is set to a fully-cold position in a ventilation mode, or where temperature control is set to a bi-level mode for keeping a passenger's head cool and feet warm, the bi-level door 14 is set to a full-open position. In other cases, the bi-level door 14 is closed.

If the motor air-conditioning amplifier unit 25 decides target door opening XPBR, the air mixing door actuator 23 receives data concerning the target door opening XPBR and actuates the mixing door 15 to the degree of door opening corresponding to the target door opening degree XPBR.

If the air-conditioning amplifier unit 25 decides a door position in a target mode, the mode door actuator 24 opens or closes the mode doors (the vent door 16, the defroster door 17, and the foot door 18).

The air-conditioning amplifier unit 25 arithmetically processes signals received from switches or sensors according to program software through use of a built-in microcomputer, thereby comprehensively controlling the blower fan motor 5, the door actuators 21, 22, 23, 24, and a compressor (not shown).

The water temperature sensor 26 detects the temperature of coolant in an engine; the coolant temperature sensor 27 detects the temperature of coolant; the internal air sensor 28 detects an interior temperature TINC; the external air sensor 29 detects an exterior temperature Tam; the insolation sensor 30 detects the amount of solar radiation amount QSUN; and the suction temperature sensor 31 detects a suction temperature TINT. The-thus detected data are sent to the air-conditioning amplifier unit 25.

The controller 32 is provided in a control panel within the passenger compartment and comprises a display 32a for displaying a mode, the speed of a fan, temperature, or the like; an operation section 32b provided with mode switches, temperature control dial, or the like; and an operation/display/communication circuit 32 for outputting data on the display 32a, for receiving an input from the operation section 32b, and for exchanging data with respect to the air-conditioning amplifier unit 25. The operation/display/communication circuit 32c is connected to the air-conditioning amplifier unit 25 via an operation data line 33, a clock signal line 34; and a display communications data line 35.

Figure 3:
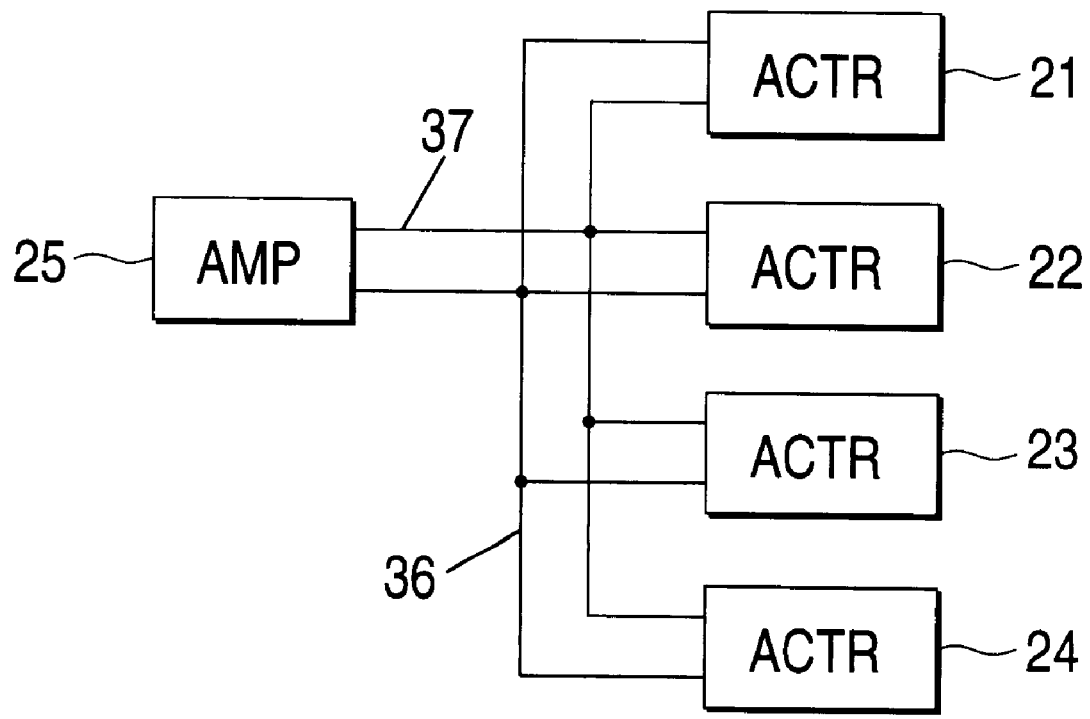
FIG. 3 is block diagram showing a network established between an air-conditioning amplifier unit and door actuators according to a first embodiment of the present invention.

FIG. 3 is block diagram showing a network established between the air-conditioning amplifier unit and the door actuators. As shown in FIG. 3, the air-conditioning amplifier unit 25 and the door actuators 21, 22, 23, and 24 are connected together by means of one communication 36 and one power line 37. The air-conditioning amplifier unit 25 sends the address of each of the door actuators 21, 22, 23, 24 and data concerning a target position of the motor. An actuator having a corresponding address receives the data and rotates the motor to the target position.

Figure 4:
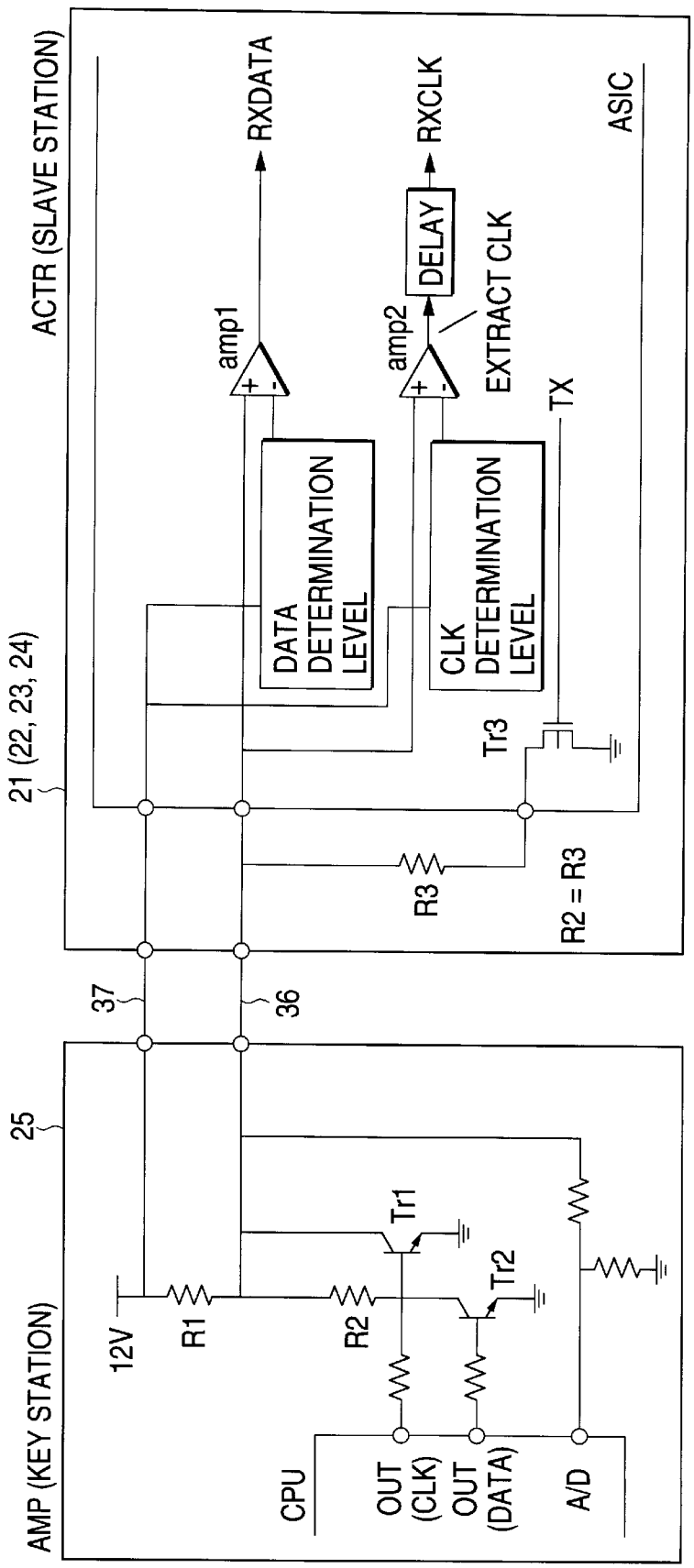
FIG. 4 is a circuit diagram showing a physical link layer from which is omitted a protective circuit disposed between the air-conditioning amplifier unit and the door actuators according to the first embodiment.

FIG. 4 is a circuit diagram showing a physical link layer (which has features of electrically connecting lines; of holding the electrically-connected lines; and of disconnecting the lines in the network) from which a protective circuit disposed between the air-conditioning amplifier unit and the door actuators is omitted. A ternary code for superimposing data on a clock signal is used as a communications signal, whereby two types of H and L pulse amplitudes are represented. ASIC of the actuator extracts a clock signal from the communications signal, and a logic circuit of ASIC performs the decoding of the communications signal (i.e., the reconstitution of the encoded data) and other operations according to the thus-extracted clock signal. Since the clock signal is supplied from only the air-conditioning amplifier unit 25, the communication rate can be arbitrarily set by means of the software of the air-conditioning amplifier unit 25.

Figure 5A:
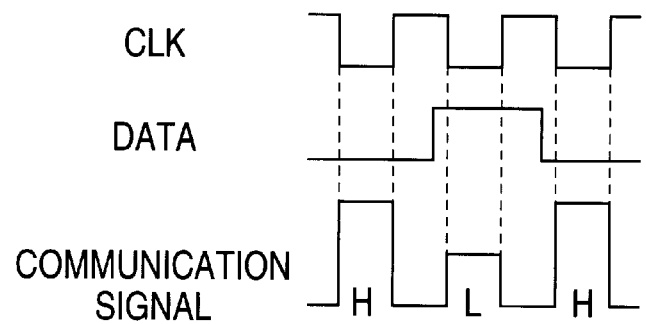
FIGS. 5A and 5B are transmission and receiving timing charts showing the transmitting and receiving actions of the air-conditioning amplifier unit and actuator.

FIG. 5A is a transmission timing chart showing the transmitting action of the air-conditioning amplifier unit 25. When an output CLK (or a clock output) is in a high state, the communication 36 is grounded by a transistor Tr1 irrespective of a DATA output (or data output). In contrast, when the output CLK is in a low state, a transistor Tr2 is turned on and off so as to correspond to the DATA output, thereby bringing the communication 36 in 12V or an intermediate potential determined byresistors R1 and R2.

Figure 5B:
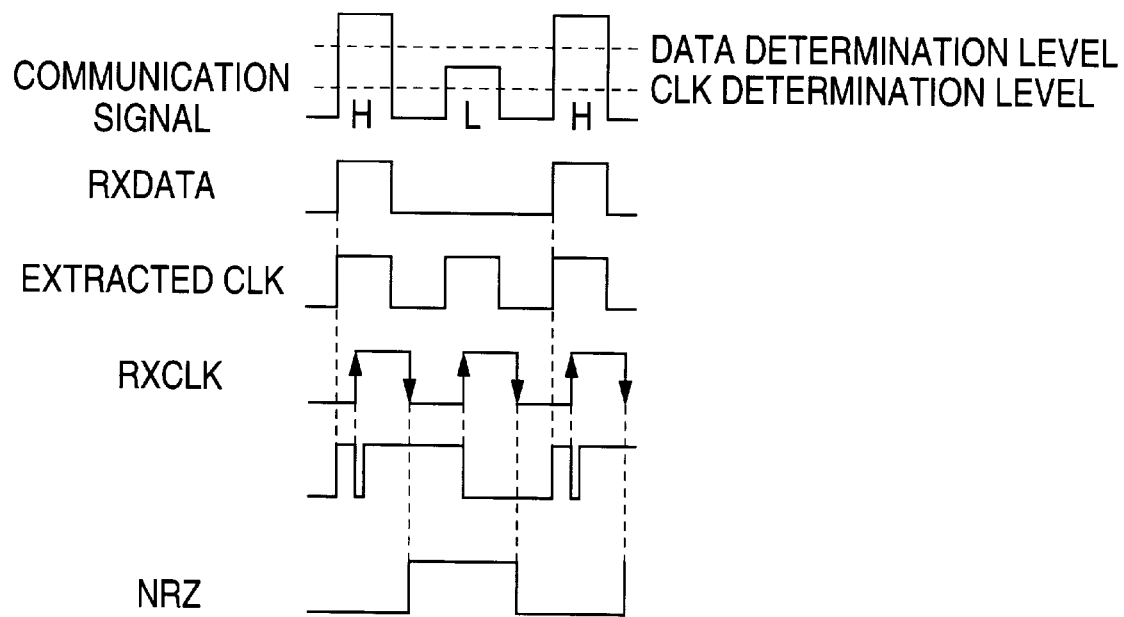

FIG. 5B is a receiving timing chart showing the receiving action of the actuator. A data extraction comparator cmp1 has a determination level greater than the amplitude of the L pulse signal, whereas a clock extraction comparator cmp2 has a determination level smaller than the amplitude of the L pulse signal. A signal which is set by RXDATA signal and reset at the leading edge of a RXCLK pulse is sampled at the trailing edge of the RXCLK pulse, thereby decoding the communications signal. Reference symbol NRZ in FIG. 5B represents extracted data.

The operation of the vehicle air-conditioning system will now be described.

[Communications Procedures]

Communications procedures will be described with reference to FIGS. 6 to 9.

As represented by pulse waveforms shown in FIG. 6A, a signal used for communication defines high and low states through use of two types of pulse amplitudes. Further, as provided in an encoding table shown in FIG. 6B, two bits of binary data are represented by combination of three pulse signals.

Figure 8:
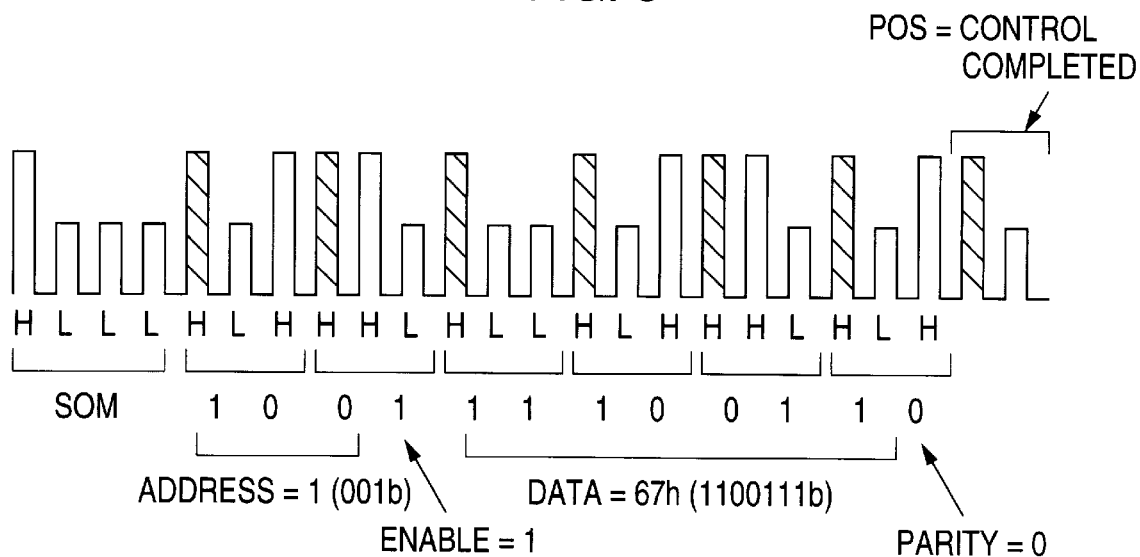
FIG. 8 is an example of the communications frame format.

As shown in FIG. 7, a communications frame format comprises a SOM (Start of Message) bit representing the start of transmission; an ADR (address) bit representing the address of the actuator to which data are transmitted; an ENA (enable) bit representing the enabling or disabling of actuation of the motor; a DATA (data) bit representing a target stopping position of the door; a PARITY (odd parity) bit representing the checking of errors in the ADR, ENA; and DATA bits; and a POS bit (control completion signal) representing a signal for diagnostics purposes returned from the actuator. FIG. 8 shows an example of the communications frame format, and hatched portions of the frame format constantly take the form of a high pulse.

A receiving sequence will now be described. Upon receipt of the SOM bit representing the start of the communications frame format, ASIC commences the receiving sequence. Only when a corresponding address is detected, ASIC acquires the data following the address bit. In contrast, in a case when a waveform or a combination of pulses not provided in the encoding table or a parity error is detected, ASIC terminates the receiving sequence and discards received data. If the SOM bit is received during the course of execution of the receiving sequence, the receiving sequence is restarted from the beginning. ASIC actuates the motor only when the ENA bit is one, but updates the data without actuating the motor if the ENA bit is zero.

Figure 9A:
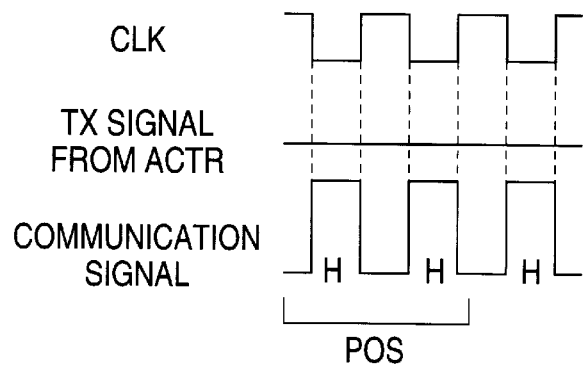
FIGS. 9A and 9B are timing charts showing POS signals during the course of control of a door and after the control of the door has been finished.
Figure 9B:
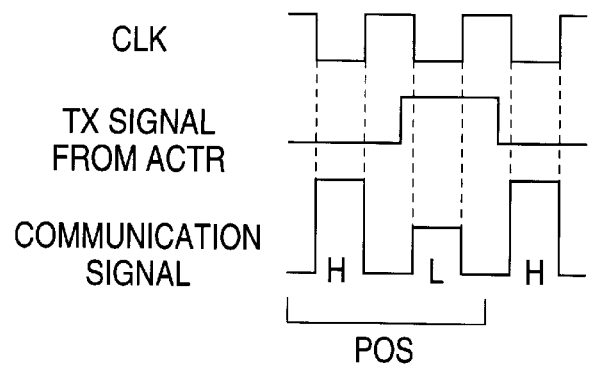

A return signal from the actuator will be described. The air-conditioning amplifier unit 25 inevitably turns off the transistor Tr2 in response to the POS signal, and two pulses representing the POS signal usually go high. If the door arrives at the target stopping position and the control of actuation of the door is completed, the actuator received a signal from the air-conditioning amplifier unit 25 turns on a transistor Tr3 at the timing at which the second pulse of the POS signal goes low. The air-conditioning amplifier unit 25 can determine whether or not the door of the actuator to which the data are transmitted is in the target stopping position by monitoring the amplitude of the POS signal. The actuator returns a signal only when having finished correctly receiving the data. The signal is not returned if there is a mismatch between the addresses or an error. FIG. 9A shows the POS signal during the course of control of the door, and FIG. 9B shows the POS signal after the control has been finished.

[Door-operation Self-diagnostics]

Figure 10:
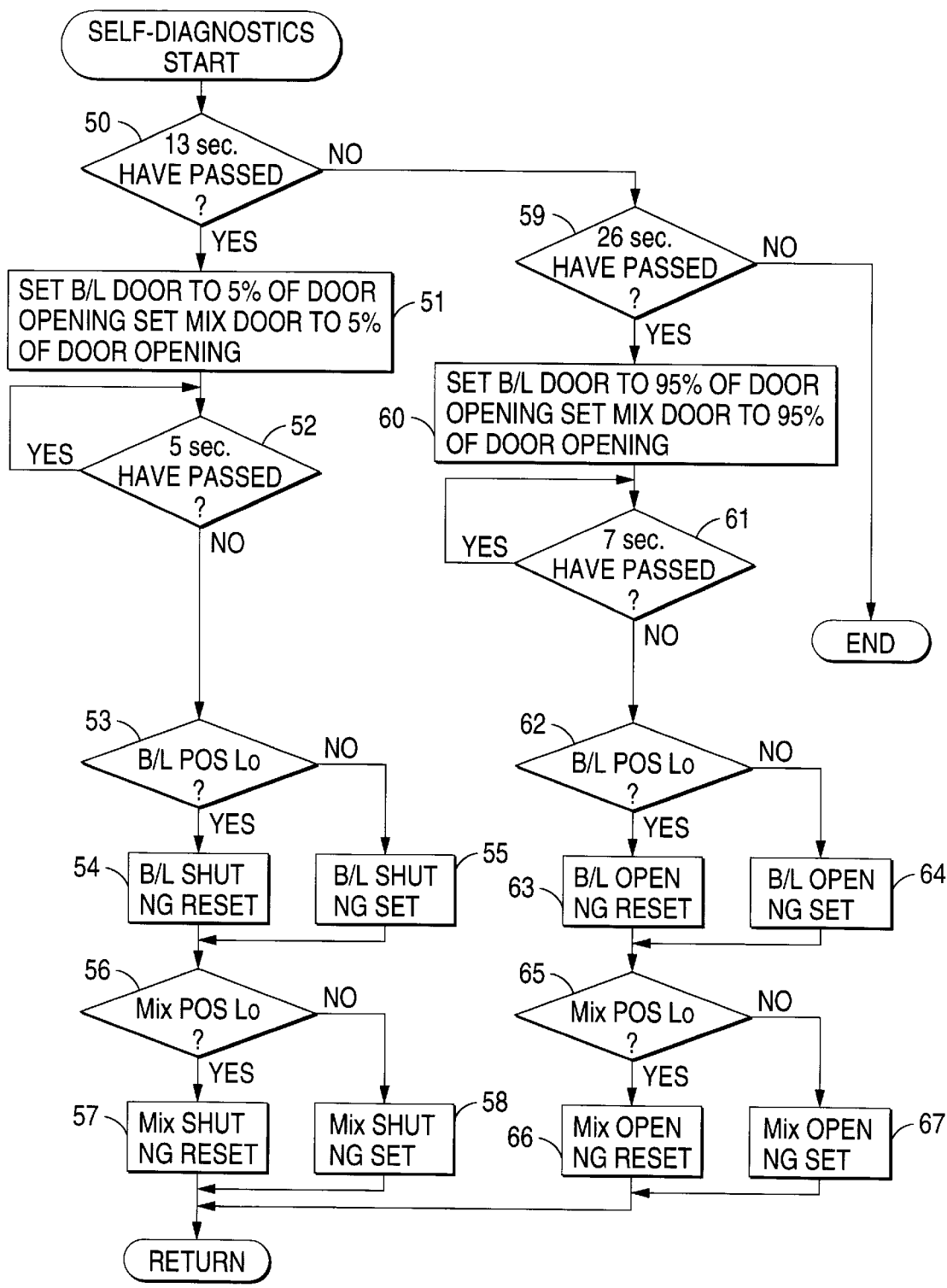
FIG. 10 is a flowchart showing the flow of door-operation self-diagnostics performed by the air-conditioning amplifier unit.

FIG. 10 is a flowchart showing the flow of door-operation self-diagnostics (corresponding to first door-operation self-diagnostic means) performed by the air-conditioning amplifier unit 25. The operation will be explained step by step.

The doors to be subjected to self-diagnostics are the bi-level door 14 and the mixing door 15, each of which has a full-open position and a full-close position. The door is checked as to whether or not it is actuated normally or abnormally with regard to each of the full-open and full-close positions.

In step 50, it is determined whether or not 13 seconds have elapsed since the self-diagnostics is commenced.

If it is decided to be YES in step 50, an instruction value (i.e., target stopping position data) for the purpose of actuating the bi-level door 14 and the mixing door 15 to 5% of the entire degree of door opening (i.e., the full-close position) is sent to each of the door actuators 22, 23 in step 51.

In step 52, it is determined whether or not five seconds have elapsed since the self-diagnostics is commenced. If this is not the case, the processing is prevented from going to the next step 53 until five seconds elapse.

In step 53, if five seconds elapse since the self-diagnostics is commenced, it is determined whether or not a signal B/L POS returned from the bi-level door actuator 22 is in a low state.

If it is determined in step 53 that the signal B/L POS returned from the bi-level door actuator 22 is in a low state, a bi-level door fully-closing NG flag (B/L SHUT NG flag) is reset in step 54.

If it is determined in step 53 that the signal B/L POS returned from the bi-level door actuator 22 is in a high state, the bi-level door fully-closing NG flag (B/L SHUT NG flag) is set in step 55.

In step 56, it is determined whether or not a signal Mix POS returned from the air mixing door actuator 23 is in a low state.

If it is determined in step 56 that the signal Mix POS returned from the air mixing door actuator 23 is in a low state, a mixing door fully-closing NG flag (Mix SHUT NG flag) is set in step 57.

If it is determined in step 56 that the signal Mix POS returned from the air mixing door actuator 23 is in a high state, the mixing door fully-closing NG flag (Mix SHUT NG flag) is set in step 58.

In step 59, it is determined whether or not 26 seconds have elapsed since the self-diagnostics is commenced.

If it is decided to be YES in step 59, an instruction value (i.e., target stopping position data) for the purpose of actuating the bi-level door 14 and the mixing door 15 to 95% of the entire degree of door opening (i.e., the full-open position) is sent to each of the door actuators 22, 23 in step 60.

In step 61, it is determined whether or not 17 seconds have elapsed since the self-diagnostics is commenced. If this is not the case, the processing is prevented from going to the next step 62 until 17 seconds elapse.

In step 62, if 17 seconds elapse since the self-diagnostics is commenced, it is determined whether or not the signal B/L POS returned from the bi-level door actuator 22 is in a low state.

If it is determined in step 62 that the signal B/L POS returned from the bi-level door actuator 22 is in a low state, a bi-level door full-opening NG flag (B/L OPEN NG flag) is reset in step 63.

If it is determined in step 62 that the signal B/L POS returned from the bi-level door actuator 22 is in a high state, the bi-level door full-opening NG flag (B/L OPEN NG flag) is set in step 64.

In step 65, it is determined whether or not the signal Mix POS returned from the air mixing door actuator 23 is in a low state.

If it is determined in step 65 that the signal Mix POS returned from the air mixing door actuator 23 is in a low state, a mixing door full-opening NG flag (Mix OPEN NG flag) is set in step 66.

If it is determined in step 65 that the signal Mix POS returned from the air mixing door actuator 23 is in a high state, the mixing door fully-closing NG flag (Mix OPEN NG flag) is set in step 67.

[Operation of the Door-operation Self-diagnostics]

In steps 50 to 58, the bi-level door 14 and the mixing door 15 are subjected to self-diagnostics as to whether or not they are actuated to the full-close position. After the lapse of the preset time of five seconds since the instruction value is changed in step 51, it is determined by means of a return signal POS whether or not the doors are fully closed appropriately. Subsequently, in steps 59 to 67, the bi-level door 14 and the mixing door 15 are subjected to self-diagnostics as to whether or not they are actuated to the full-open position.

If the NG flag is set in any one of the steps 55, 58, 64, and 67, message NG is displayed. In contrast, if the NG flag is reset in all of the steps 54, 57, 63, and 66, message OK is displayed.

Figure 11:
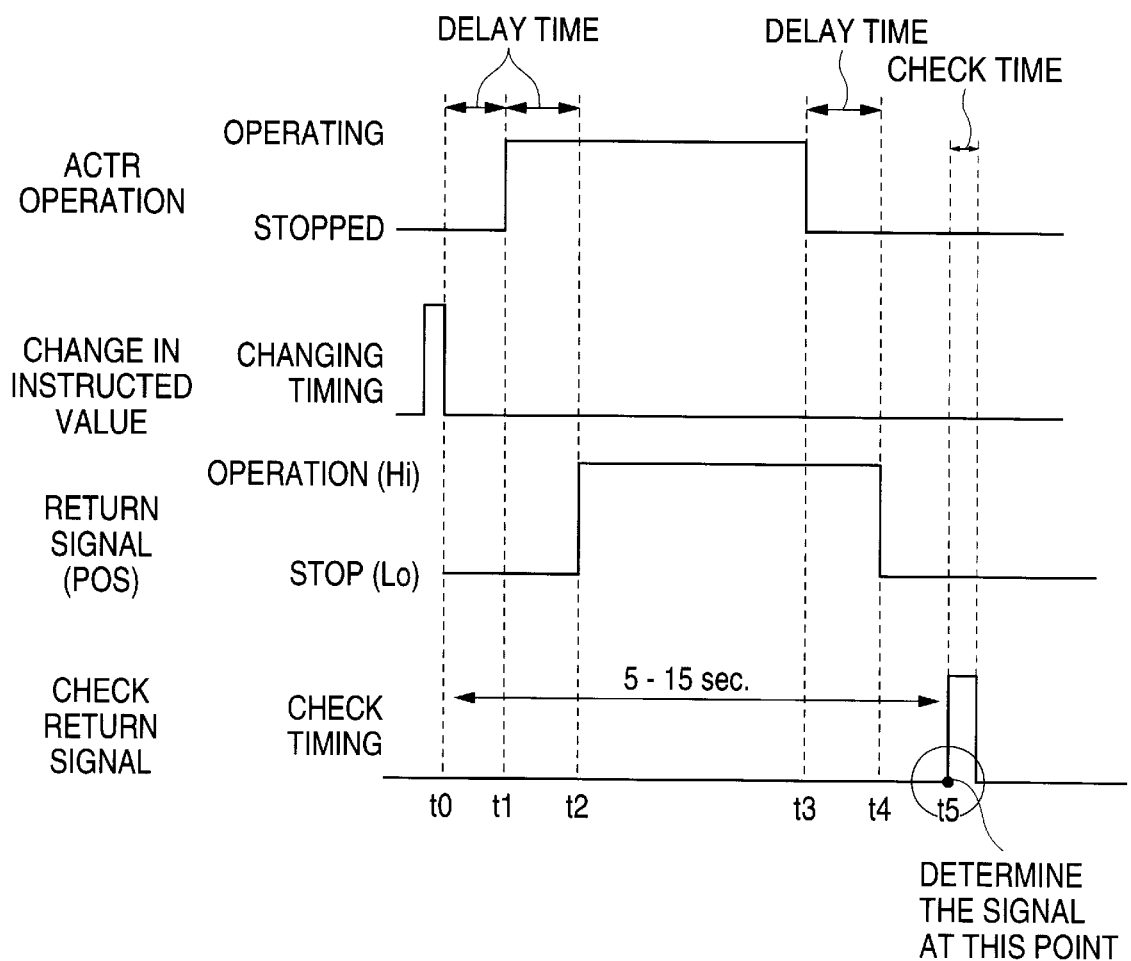
FIG. 11 is a timing chart showing the timing at which a return signal is checked by the door-operation self-diagnostics performed by the air-conditioning amplifier unit according to the first embodiment.

FIG. 11 is a timing chart showing the timing at which the return signals are checked by a door-operation self-diagnostics according to the first embodiment.

First, if the instruction value to be sent to the door actuators 22, 23 is changed, the operations of the door actuators 22, 23 are commenced at a point in time "t1" lagged behind a point in time "t0" at which the instruction value is changed. Further, the return signals POS are changed from a low state where the actuators are stopped to a high state where the actuators are actuated, at a point in time "t2" lagged behind the commencement of operations of the door actuators 22, 23.

When the operations of the door actuators 22, 23 are completed at a point in time "t3," the return signals POS are switched from a high state where the actuators are actuated to a low state where the actuators are stopped, at a point in time "t4" lagged behind a point in time "t3" at which the operations of the door actuators are completed.

If the return signals are checked at a point in time "t5" after the point in time "t4," the return signals POS are placed into a low state where the actuators are stopped, so long as the door operations are normal. It is possible to determined whether or not the door actuators are normal by checking the return signal POS.

Consequently, it is important to determine the check time "t5" after how much time has elapsed from the point in time "t0" at which the instruction value is changed. In a case where there is change in the instruction value, the period of time is determined in consideration of the time period required for the door to arrive at a target stopping position and a lag in communication.

More specifically, in a case where there is change in the instruction value, the time periods t1 to t3 required for the doors to arrive at the target stopping positions are determined by; e.g., the maximum operation time of the actuators when the instruction value is changed so as to actuate the doors from the full-open position to the full-close position. Lags t0 to t1 and t3 to t4 in communication are determined by the number of door actuators and a preset communication rate, and hence preset periods of time t0 to t5 are given by the following equation;

Preset period of time Lag=(t0 to t1)+ the operation time of the actuator (t1 to t3)+ lag (t3 to t4)+ lead time (t4 to t5) The period of time is specifically set to about 5 to 15 seconds.

The advantageous results of the vehicle air-conditioning system will now be described.

The air-conditioning amplifier unit 25 and the plurality of door actuators 21, 22, 23, and 24 are connected together by means of one communication line 36 and one power line 37. The air-conditioning amplifier unit 25 is provided with a door-operation self-diagnostic program which sends the target stopping position data for the purpose of bringing the door to the full-open or full-close position are sent to the door actuators 22, 23. If there is a change in the instruction value, after the lapse of the preset period of time (e.g., five seconds) which takes into account the time period required for the door to arrive at a target stopping position and a lag communication, the program determines the doors to be in a normal state if the signals POS returned from the door actuators 22, 23 represent that the doors are in a stopped state. In contrast, if the return signals POS represent that the doors are in an actuated state, the program determines the doors to be in an abnormal state. As a result, it is possible to provide a door-operation self-diagnostic apparatus which ensures the reduction in the weight and cost of the air-conditioning system by connecting, in the form of a LAN, the air-conditioning amplifier to the door actuators; and which correctly determines whether or not the doors are in a normal state or an abnormal state by means of the return signals POS which represent a change in the instruction value to actuate the doors toward the full-open or full-close position and the stop and actuation of the doors.

The doors to be subjected to the self-diagnostics are the bi-level door 14 and the mixing door 15 which are stopped at the full-open and full-close positions. Further, it is determined whether the doors are in a normal or abnormal state with regard to each of the full-open and full-close positions. Accordingly, in each of the closing and opening directions, it is possible to determine whether the doors are actuated normally or abnormally.

2nd Embodiment

The configuration of a second embodiment of the present invention is the same as that of the system in the first embodiment, and therefore its explanation will be omitted.

Next, the operation of the system will be described.

As in the first embodiment, the communications procedures are performed in an analogous manner according to the operations shown in FIGS. 6 through 9.

[Door-operation Self-diagnostics]

Figure 12:
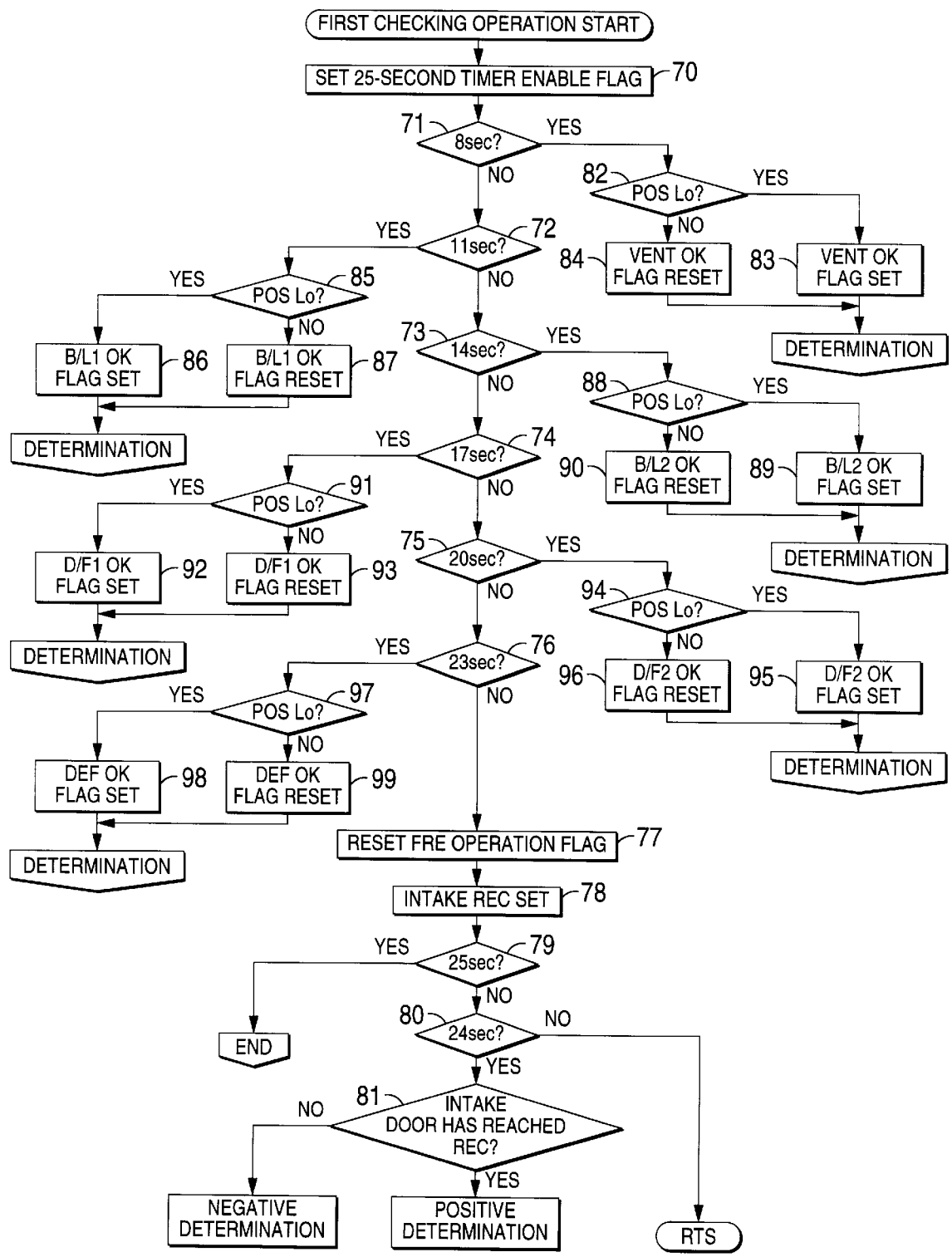
FIG. 12 is a flowchart showing the flow of the first door-operation self-diagnostics performed by an air-conditioning amplifier unit according to a second embodiment of the present invention.
Figure 13:
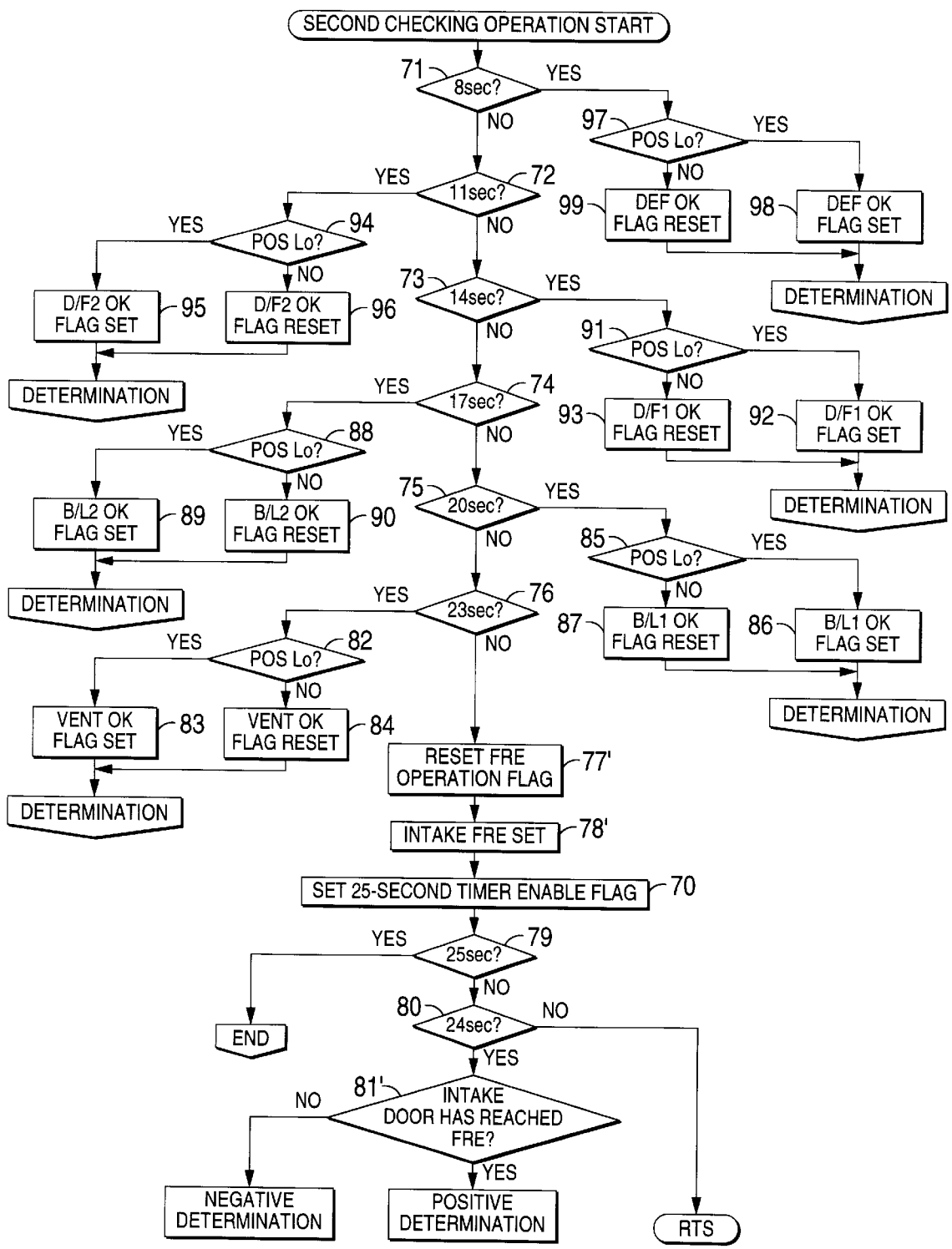
FIG. 13 is a flowchart showing the flow of the second door-operation self-diagnostics performed by an air-conditioning amplifier unit according to the second embodiment.

FIGS. 12 and 13 are flowcharts showing the flow of door-operation self-diagnostics (corresponding the second door-operation self-diagnostics means) performed by the air-conditioning amplifier unit 25.

A substance to be subjected to self-diagnostics is a mode door actuator 24 which is stopped at intermediate positions corresponding to a plurality of modes between the ventilation mode and the defroster mode. In this example, there are performed a first checking operation (shown in FIG. 12) in which the mode is sequentially changed from the ventilation mode to the defroster mode and a second checking operation (shown in FIG. 13) in which the mode is sequentially changed from the defroster mode to the ventilation mode.

In conjunction with the self-diagnostics of the mode door actuator 24, the intake door actuator 21 is also subjected to self-diagnostics.

First, the first checking operation shown in FIG. 12 will be described step by step.

A 25-second timer enable flag is set in step 70.

It is determined in step 71 whether or not 8 seconds have elapsed.

It is determined in step 72 whether or not 11 seconds have elapsed.

It is determined in step 73 whether or not 14 seconds have elapsed.

It is determined in step 74 whether or not 17 seconds have elapsed.

It is determined in step 75 whether or not 20 seconds have elapsed.

It is determined in step 76 whether or not 23 seconds have elapsed.

An exterior air introduction (FRE) flag is reset in step 77.

In step 78, the intake door 6 is set to an interior air circulation mode in which the intake door is actuated so as to circulate the interior air.

It is determined in step 79 whether or not 25 seconds have elapsed.

It is determined in step 80 whether or not 24 seconds have elapsed.

It is determined in step 81 whether or not the intake door 6 has arrived at an interior air circulation position. If this is the case, the actuation of the intake door to the interior air circulation position performed by the intake door actuator 21 is determined to be proper. In contrast, if this is not the case, the actuation of the intake door by the intake door actuator 21 is determined to be improper.

It is determined in step 82 whether or not the return signal POS which is returned from the mode door actuator 24 after the lapse of eight seconds (i.e., the first preset period of time) since the instruction value of ventilation mode is transmitted to the mode door actuator 24 at the beginning of the processing is in a low state.

In a case where the return signal POS is in a low state, a ventilation OK flag is set in step 83.

In a case where the return signal POS is in a high state, the ventilation OK flag is reset in step 84.

It is determined in step 85 whether or not the signal POS which, after lapse of three seconds (i.e., a second preset period of time), is returned in response to an instruction value of bi-level 1 mode transmitted after the lapse of eight seconds since the processing is commenced is in a low state.

In a case where the return signal POS is in a low state, a bi-level 1 OK flag is set in step 86.

In a case where the return signal POS is in a high state, the bi-level 1 OK flag is reset in step 87.

It is determined in step 88 whether or not the signal POS which, after lapse of three seconds (i.e., the second preset period of time), is returned in response to an instruction value of bi-level 2 mode transmitted after the lapse of 11 seconds since the processing is commenced is in a low state.

In a case where the return signal POS is in a low state, a bi-level 2 OK flag is set in step 89.

In a case where the return signal POS is in a high state, the bi-level 2 OK flag is reset in step 90.

It is determined in step 91 whether or not the signal POS which, after lapse of three seconds (i.e., the second preset period of time), is returned in response to an instruction value of defroster foot 1 mode transmitted after the lapse of 14 seconds since the processing is commenced is in a low state.

In a case where the return signal POS is in a low state, a defroster foot 1 OK flag is set in step 92.

In a case where the return signal POS is in a high state, the defroster foot 1 OK flag is reset in step 93.

It is determined in step 94 whether or not the signal POS which, after lapse of three seconds (i.e., the second preset period of time), is returned in response to an instruction value of defroster foot 2 mode transmitted after the lapse of 17 seconds since the processing is commenced is in a low state.

In a case where the return signal POS is in a low state, a defroster foot 2 OK flag is set in step 95.

In a case where the return signal POS is in a high state, the defroster foot 2 OK flag is reset in step 96.

It is determined in step 97 whether or not the signal POS which, after lapse of three seconds (i.e., the second preset period of time), is returned in response to an instruction value of defroster mode transmitted after the lapse of 20 seconds since the processing is commenced is in a low state.

In a case where the return signal POS is in a low state, a defroster OK flag is set in step 98.

In a case where the return signal POS is in a high state, the defroster OK flag is reset in step 99.

The second checking operation shown in FIG. 13 will be described step by step.

The second checking operation is different from the first checking operation shown in FIG. 12 in that the modes are changed in the reverse order, and that the intake door actuator 21 is subjected to self-diagnostics as to whether or not it is actuated so as to introduce exterior air. In the steps that are the same as those shown in FIG. 12, similar processing is executed, and therefore their explanations will be omitted.

An exterior air introduction (FRE) flag is set in step 77'.

In step 78', the air-conditioning system is set to an exterior air introduction mode, in which the intake door 6 is actuated so as to introduce exterior air (FRE).

It is determined in step 81' whether or not the intake door 6 has arrived at an exterior air introduction position. If this is the case, the actuation of the intake door performed by the intake door actuator 21 is determined to be proper. In contrast, if this is not the case, the actuation of the intake door by the intake door actuator 21 is determined to be improper.

[Operation of the Door-operation Self-diagnostics]

In steps 77 to 81 shown in FIG. 12, the intake door 6 is subjected to self-diagnostics as to whether or not it is actuated so as to circulate interior air. Further, in steps 77' to 87' shown in FIG. 13, the intake door 6 is subjected to self-diagnostics as to whether or not it is actuated so as to introduce exterior air.

The mode doors 10, 11, and 12 are subjected to self-diagnostics by means of the first checking operation performed in steps 70 to 76 and 82 to 99 shown in FIG. 12 and the second checking operation performed in steps 70 to 76 and 82 to 99 shown in FIG. 13. There is transmitted an instruction signal for the purpose of sequentially changing modes in the order (shown in FIG. 14) in which the mode door actuator 24 is stopped at positions. In an initial instruction mode, there is a wait for the lapse of eight seconds (i.e., the first preset period of time) since the processing is commenced in consideration the time period required for the door received the instruction value to arrive at a target position and a lag in communication. In the subsequent modes, there is a wait for the lapse of three seconds (i.e., the second preset period of time) in consideration of the time period required for the door to arrive at the adjacent intermediate stopping position and a lag in communication. If the signal POS returned from the mode door actuator 24 is in a low state where the door is stopped, the door is determined to be in a normal state. In contrast, if the signal POS returned from the mode door actuator 24 is in a high state where the door is actuated, the door is determined to be in an abnormal state.

If an OK flag is reset in any one of steps 84, 87, 90, 93, 96, and 99, message NG is displayed. In contrast, if the OK flag is set in all steps 83, 86, 89, 92, 95, and 98, message OK is displayed.

Figure 14:
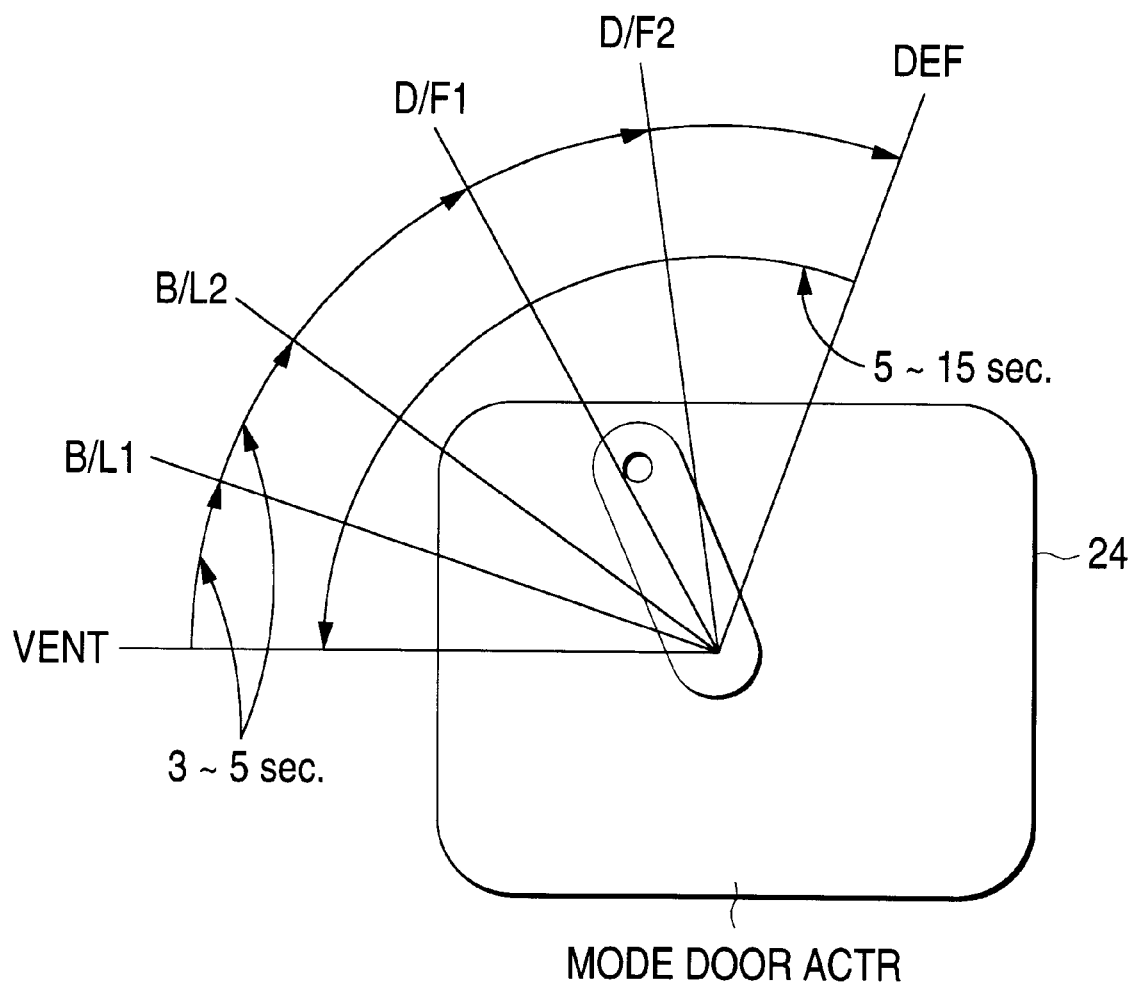
FIG. 14 is a diagrammatic representation showing a mode actuator for explaining the order in which modes are changed by a self-diagnostics according to a second embodiment.

FIG. 14 is a diagrammatic representation showing the door actuator for explaining the timing at which the return signal is checked by a door-operation self-diagnostics according to the second embodiment.

First, the instruction value sent to the mode actuator 24 sequentially changes the mode of the air-conditioning system in the order in which the actuator is stopped at positions (e.g., a ventilation mode→bi-level mode 1→bi-level mode 2→defroster foot 1→defroster foot 2).

At the time of this self-diagnostics, in the initial ventilation instruction mode, there is a wait for the lapse of 5 to 15 seconds (i.e., the first preset period of time) since the processing is commenced in consideration of the maximum time period required for the door received the instruction value to arrive at a target position (i.e., the time period required for the door to move to the target position from the position where the door is stayed in the defroster mode) and a lag in communication. In the subsequent modes, there is a wait for the lapse of 3 to 5 seconds (i.e., the second preset period of time) in consideration of the time period required for the door to arrive at the adjacent stopping position (i.e., a short period of time over which the door is actuated through a small angle) and a lag in communication.

As described above, since the return signal POS is checked after the lapse of the first long preset period of time in the initial ventilation instruction mode, it is possible to prevent a false decision attributable to a short preset time period in a case where the door remains in the defroster-mode position.

In a case where the return signal is checked in each mode position, if the wait time required for each mode position is set to the first preset period of time, the total amount of time required for determination becomes long. In contrast, in addition to the first preset period of time, the second shorter preset period of time is set in consideration of the fact that it takes a shorter period of time for the door to move to the adjacent mode position. As a result, the total amount of time required for determination can be comparatively reduced.

The advantageous results of the vehicle air-conditioning system will be described.

The air-conditioning amplifier unit 25 and the plurality of door actuators 21, 22, 23, and 24 are connected together by means of one communication line 36 and one power line 37. The air-conditioning amplifier unit 25 is provided with a door-operation self-diagnostic program which transmits an instruction signal for the purpose of sequentially changing modes in the order in which the mode door actuator 24 is stopped at positions. In an initial instruction mode, the self-diagnostic program waits for the lapse of eight seconds (i.e., the first preset period of time) since the processing is commenced, the time period taking into account the time period required for the door received the instruction value to arrive at a target position and a lag in communication. In the subsequent modes, the self-diagnostic program waits for the lapse of three seconds (i.e., the second preset period of time) which takes into account the time period required for the door to arrive at the adjacent intermediate stopping position and a lag in communication. If the signal POS returned from the mode door actuator 24 is in a low state where the door is stopped, the door is determined to be in a normal state. In contrast, if the signal POS returned from the mode door actuator 24 is in a high state where the door is actuated, the door is determined to be in an abnormal state. As a result, it is possible to provide a door-operation self-diagnostic apparatus which ensures the reduction in the weight and cost of the air-conditioning system by connecting, in the form of a LAN, the air-conditioning amplifier to the door actuators; and which, in a comparatively short period of time, correctly determines whether or not the door is in a normal state or an abnormal state by means of the return signal POS which represents the stop and actuation of the door and a change in the stopping position of the door actuator.

The door to be subjected to the self-diagnostics is the mode door actuator 24 which is stopped at the intermediate stopping positions corresponding to a plurality of modes between the ventilation mode to the defroster mode. Further, the self-diagnostics apparatus is designed to as to perform the second checking operation in which the modes are sequentially changed in the reverse order after having performed the first checking operation in which the modes are sequentially changed. Accordingly, in each of the directions of forward and reverse actuation, it is possible to determine whether the door is actuated normally or abnormally.

Although the vehicle air-conditioning system according to the first and second embodiments are provided with the four door actuators 21, 22, 23, and 24, it goes without saying that the door-operation self-diagnostic apparatus can be applied to a system comprising four or more door actuators.

The diagnostics may be applied to an intake door actuator in such a way as to determine whether or not the door is properly actuated in each of the positions of the door actuator by changing the position in the order of RE→20FRE →FRE. In this case, the initial wait time may be set to a long period of time, and the wait time required for the subsequent modes may be set to a short period of time.

3rd Embodiment

Figure 15A:
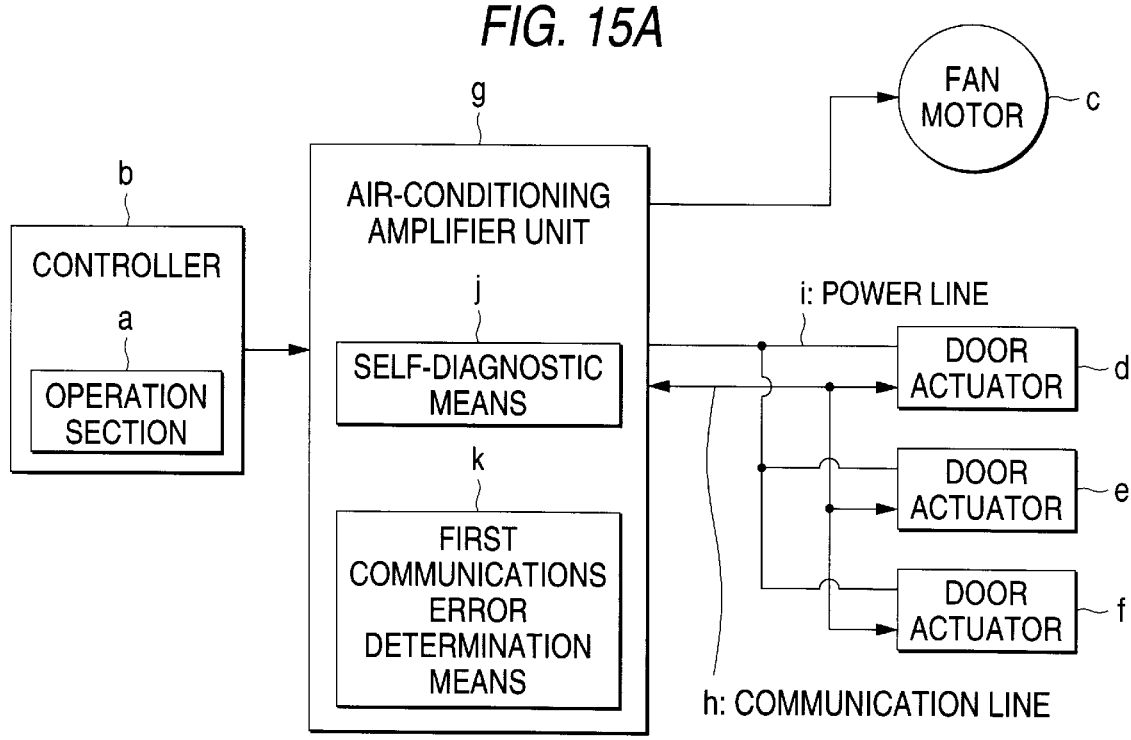
FIGS. 15A and 15B are block diagrams which correspond to an illustrate a self-diagnostic apparatus for diagnosing the operations of doors and determining a communications error in a vehicle air-conditioning system according to the present invention.
Figure 15B:
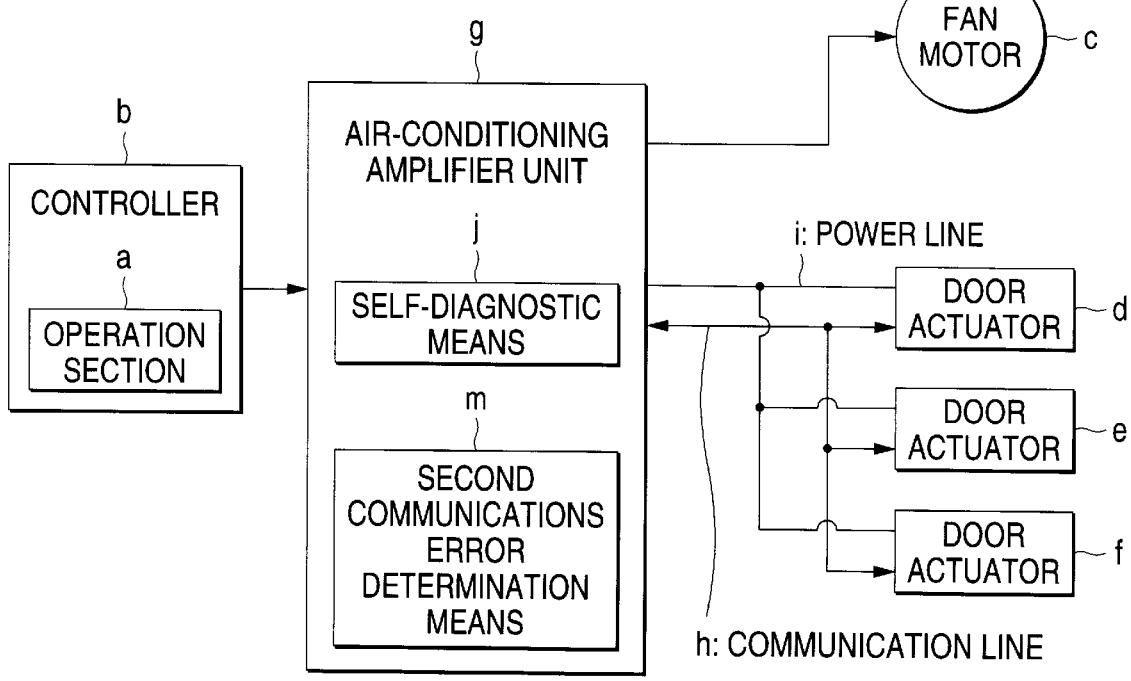

The configuration of a third embodiment of the present invention is substantially same as shown in FIGS. 15A and 15B that of the system in the aforementioned embodiments, and therefore its explanation will be omitted.

Next, the operation of the system will be described.

As in the first embodiment, the communications procedures are performed in an analogous manner according to the operations shown in FIGS. 6 through 9.

[Communications Error Determination]

Figure 16:
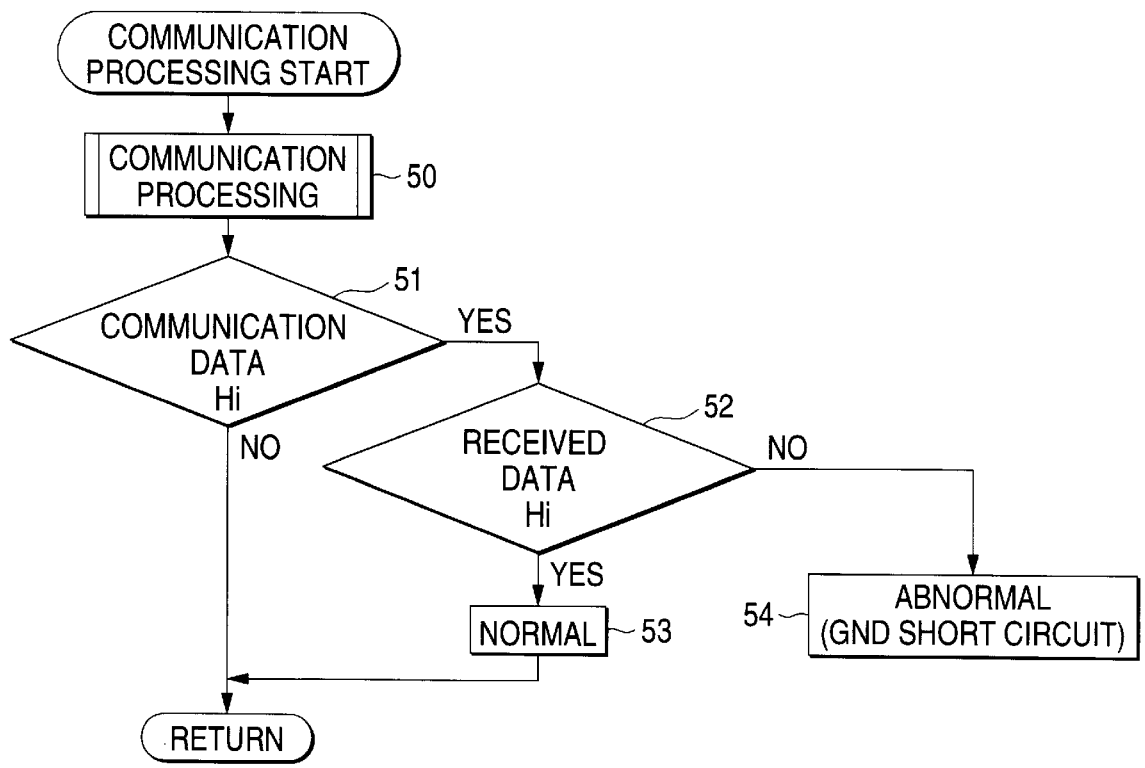
FIG. 16 is a flowchart showing the flow of determination of a communications error due to a grounded short circuit performed by the air-conditioning amplifier unit according to a third embodiment.

FIG. 16 is a flowchart showing the flow of determination of a communications error due to a grounded short circuit performed by the air-conditioning amplifier unit 25 in the third embodiment. This error determination processing will be described step by step.

Communications processing, such as transmission or receipt, is carried out in step 50.

It is determined in step 51 whether or not the data which the air-conditioning amplifier unit 25 output are in a high state.

It is determined in step 52 whether or not the data received by the air-conditioning amplifier unit 25 are in a high state.

If the determinations made in steps 51 and 52 are YES, it is determined in step 53 that there is no error in communication and the door actuator control system is in a normal state.

If the determination made in step 52 is YES (i.e., the received data are in a low state) in spite of the fact that the determination made in step 51 is YES (i.e., the transmitted data are in a high state), it is determined in step 54 that there is an error in communication due to a grounded short circuit and the door actuator control system is in an abnormal state.

Figure 17:
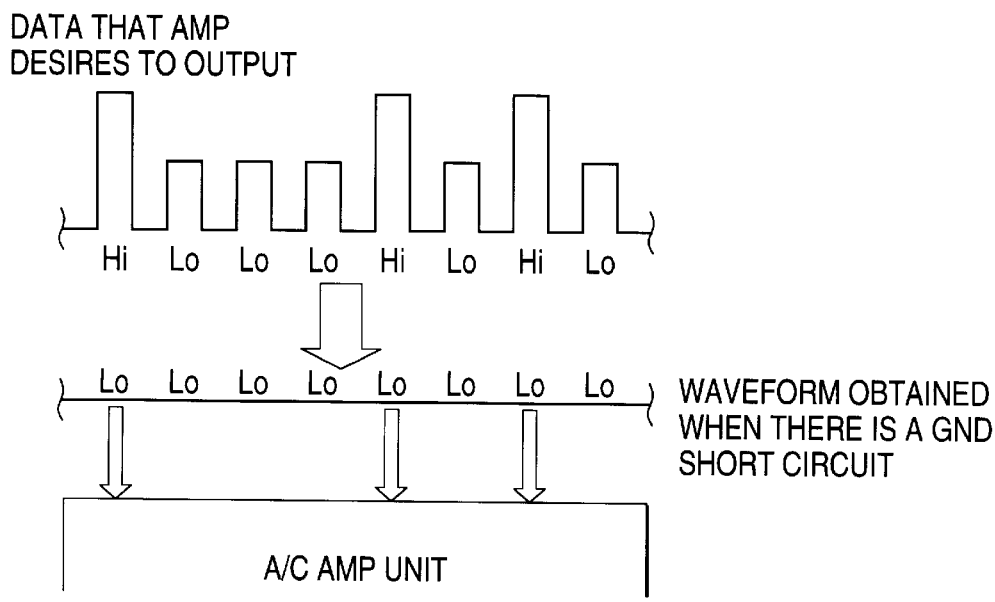
FIG. 17 is a timing chart for explaining the determination of a communications error performed by the air-conditioning amplifier unit according to the third embodiment.

FIG. 17 is a timing chart for describing the determination of a communications error performed by the air-conditioning amplifier unit 25 in the third embodiment.

First, as shown in an upper portion in FIG. 17, the data which the air-conditioning amplifier unit 25 output are combination of high-level signals and low-level signals (see FIG. 8).

In contrast, as shown in a middle portion in FIG. 17, the data which are transmitted via the communication 36 when there is a grounded short circuit includes only low-level signals.

Accordingly, if the data (i.e., monitored data) received by the air-conditioning amplifier unit 25 are in a low state in spite of the transmission of the data in a high state, it can be determined that there is a communications error due to a grounded short circuit.

In short, in a case where the door actuator control system is determined to be normal or abnormal by means of the aforementioned self-diagnostics, if there is a grounded short circuit, the returned signals POS are constantly in a low state. As a result, the door actuator control system is falsely determined to be in a normal state. The determination of a communications error by monitoring the signal level of the transmitted and received data shown in FIGS. 11 and 16 is intended to prevent the foregoing false determination.

The advantageous result of the communications error detection device will be described.

The air-conditioning amplifier unit 25 and the plurality of door actuators 21, 22, 23, and 24 are connected together by means of one communication line 36 and one power line 37. There is provided a communications frame format which sequentially sends target door stopping position data DATA, or the like, to each of the door actuators 21, 22, 23, and 24 from the air-conditioning amplifier unit 25 via the communication 36, and the data to be transmitted included in the format is additionally provided with a return signal which represents the actuation or stop of the door actuators 21, 22, 23, and 24. Further, the air-conditioning amplifier unit 25 is provided with a self-diagnostic program which changes the instruction value of target door stopping position data DATA and checks the signals POS returned from the actuators after the lapse of delay time. If the return signals POS are in a low state, the self-diagnostic program determines the actuators to be in a normal state. However, if the return signals POS are in a high state, the self-diagnostic program determines the actuators to be in an abnormal state. Moreover, the air-conditioning amplifier unit 25 is provided with a communications error determination program. The communications error determination program compares the data which the air-conditioning amplifier unit 25 output with the data received by the air-conditioning amplifier unit 25. If the received data corresponding to the transmitted data in a high state are in a low state, the communications error determination program determines that there is an error in communication due to grounded short circuit. As a result, it is possible to provide a communications error determination device capable of ensuring the reduction in the weight and cost of an air-conditioning system by connecting, in the form of a LAN, the air-conditioning amplifier to the door actuators, as well as of correctly determining a communications error if there is a grounded short circuit in the communication 36.

4th Embodiment

An explanation will be given of a communications error determination device according to a fourth embodiment of the present invention.

The system according to the second embodiment is also the same in operation as that in the third embodiment, and therefore its explanation will be omitted.

[Determination of Communications Error]

Figure 18:
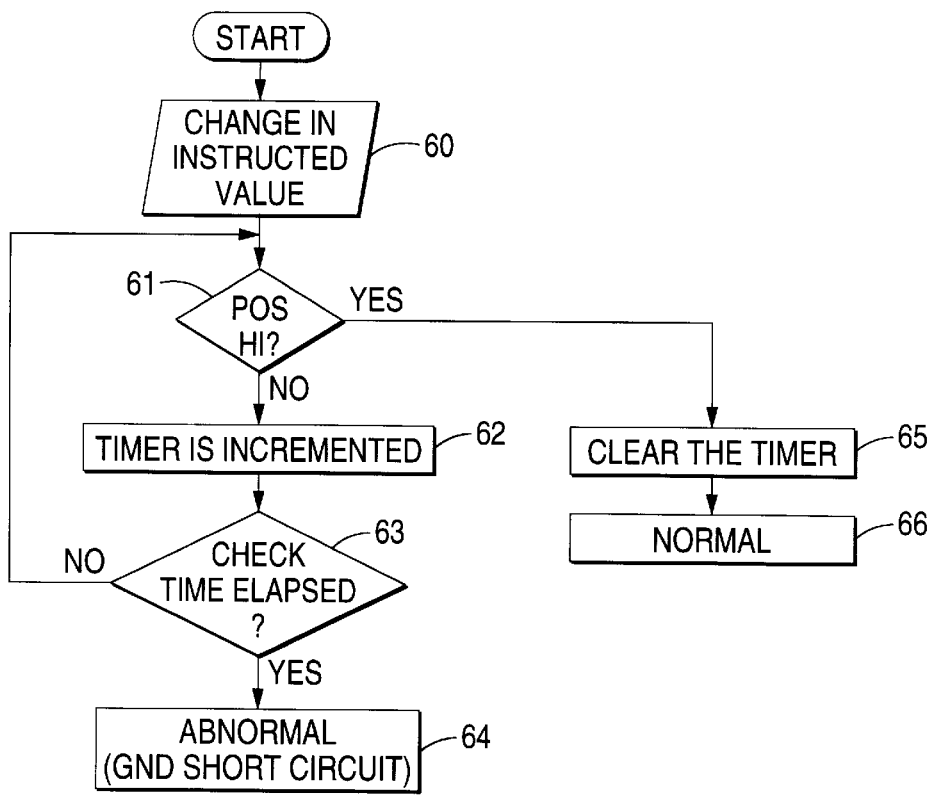
FIG. 18 is a flowchart showing the flow of determination of a communications error due to a grounded short circuit performed by an air-conditioning amplifier unit according to a fourth embodiment.

FIG. 18 is a flowchart showing the flow of determination of a communications error due to a grounded short circuit performed by the air-conditioning amplifier unit 25 in the fourth embodiment. The error determination processing will be described step by step.

The instruction value sent to the door actuators from the air-conditioning amplifier unit 25 is changed in step 60.

It is determined in step 61 whether or not the return signals POS are in a high state.

The value of a timer is incremented in step 62.

It is determined in step 63 whether or not the check time has elapsed by comparing the value of the timer with a preset timer value.

The processing performed in steps 61 to 63 are repeated in step 64. If the check time has elapsed while the return signals POS stay in a low state, it is determined that there is an error in communication due to a grounded short circuit.

If the return signals POS go high as a result of the determination in step 61, the value of the timer is cleared in step 65.

It is determined in step 66 that there is no communications error and the door actuator control system is in a normal state.

Figure 19:
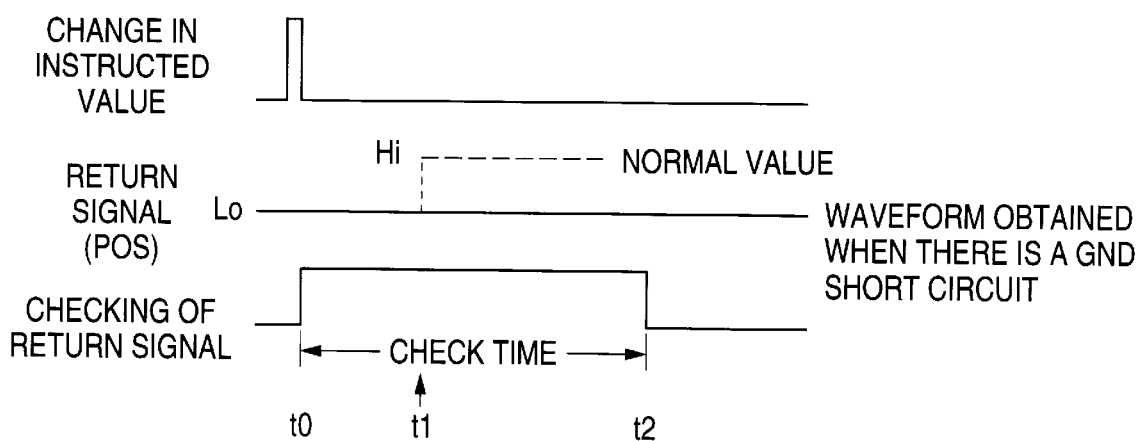
FIG. 19 is a timing chart for explaining the determination of a communications error performed by the air-conditioning amplifier unit according to the fourth embodiment.

FIG. 19 is a timing chart for explaining the determination of communications error performed in the air-conditioning amplifier unit 25 according to the fourth embodiment.

The checking of the return signals POS is commenced at the point in time t0 at which the instruction value sent to the door actuators from the air-conditioning amplifier unit 25 is changed. If there is no errors in communication and the door actuator control system is in a normal state, the return signals POS go high from a low state at the point in time t1 after the lapse of delay time. The processing proceeds along the flow from step 61→step 65→step 66 shown in FIG. 18. It is determined in step 66 that the door actuator control system is in a normal state.

In contrast, if there is an error in communication due to a grounded short circuit, the return signals POS do not go high and stay in a low state even after the lapse of the point in time t2 (check time t0 to t2). Therefore, the processing is repeated along the flow from step 61→step 62→step 63 shown in FIG. 18. If the condition of time provided in step 63 is satisfied, the processing will proceed to step 64. It is determined in step 64 that there is an error in communication due to a grounded short circuit and the door actuator control system is in an abnormal state.

The advantageous result of the communications error determination device will now be described.

In place of the communications error determination program used in the third embodiment, the air-conditioning amplifier unit is provided with another communications error determination program, the air-conditioning amplifier unit 25 is provided with a communications error determination program which commences the checking of the return signals POS at a point in time t0 at which the instruction value sent to the door actuators from the air-conditioning amplifier unit 25 is changed. If the return signals POS do not go high but still remain in a low state even after the lapse of check time, the communications error determination program determines that there is an error in communication due to grounded short circuit. As a result, it is possible to provide a communications error determination device capable of ensuring the reduction in the weight and cost of an air-conditioning system by connecting, in the form of a LAN, the air-conditioning amplifier to the door actuators, as well as of correctly determining a communications error if there is a grounded short circuit in the communication 36.

In addition, the communications error determination method is based on the change in the instruction value and the monitoring of the returned signals POS, as is the self-diagnostics. Therefore, this determination method may be carried out while being incorporated into the self-diagnostics.

5th Embodiment

An explanation will be given of a vehicle air-conditioning system according to a fifth embodiment of the present invention.

The system according to the fifth embodiment is substantially common with the aforementioned embodiments, and therefore the explanation of the common portion will be omitted.

Figure 22:
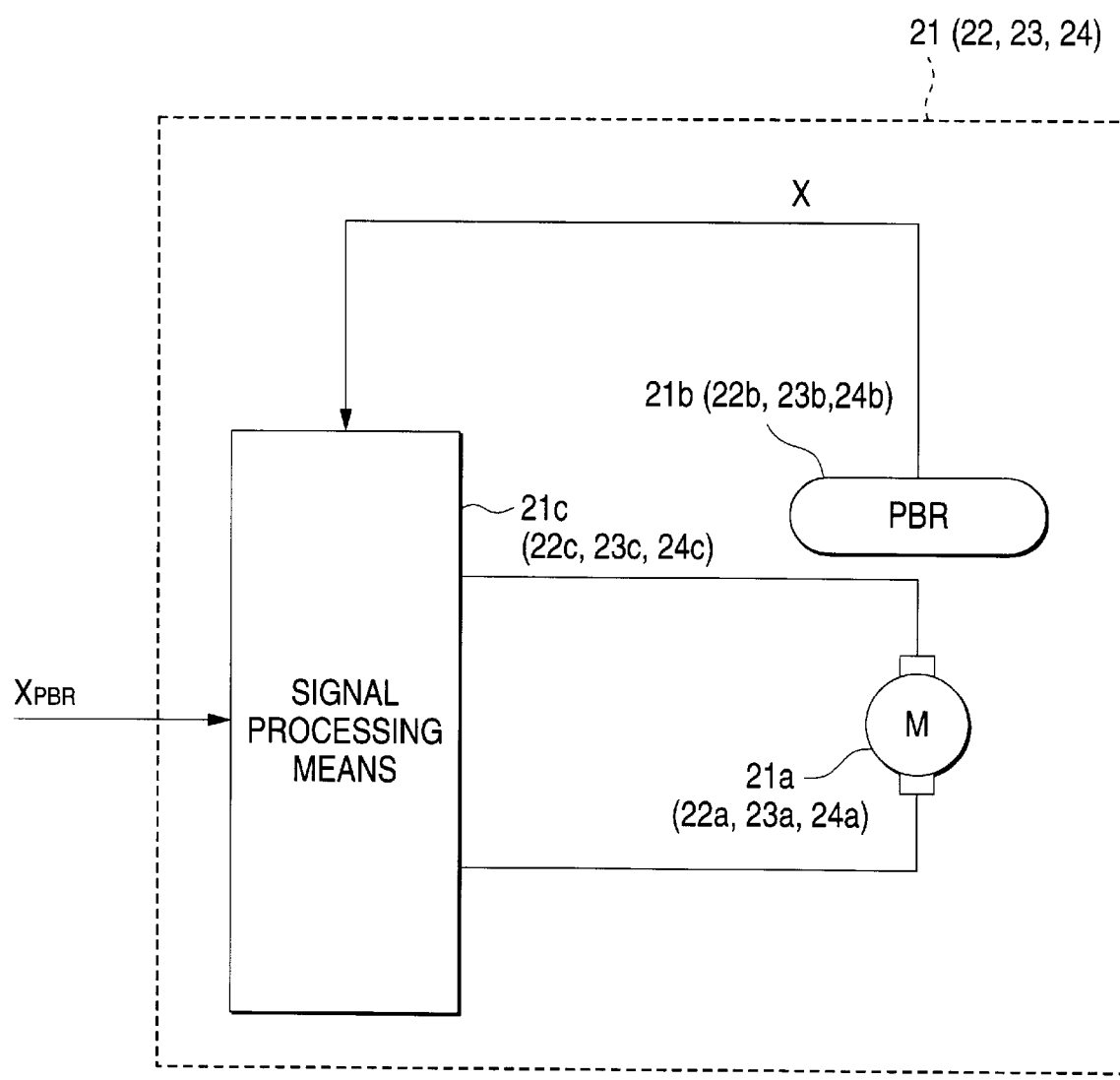
FIG. 22 is a block diagram showing an air mixing door actuator applied to the present invention.

Hereupon, the detailed explanation of the previously-described door actuator (21 to 24) will be provided according to FIG. 22. The door actuator 21 comprises a motor 21a for mechanically opening or closing a door; a door opening sensor 21b for detecting the degree of opening of the door by converting it into a voltage value; and a signal processing circuit 21c made up of an IC chip, or the like. Once a target door opening XPBR is determined by the air-conditioning amplifier unit 25, the data concerning the target door opening are received by the signal processing circuit 21c. The signal processing circuit 21c applies an electrical current to the motor 21a in such a way as to match the degree of door opening X actually detected by the door opening sensor 21b with the target door opening. The door opening sensor 21b constituted of a built-in PBR (potentiometer balance resistor) of the door actuator 21 may be constituted of another component such as an encoder. Other actuators 22, 23 and 24 have the same structure.

Figure 21:
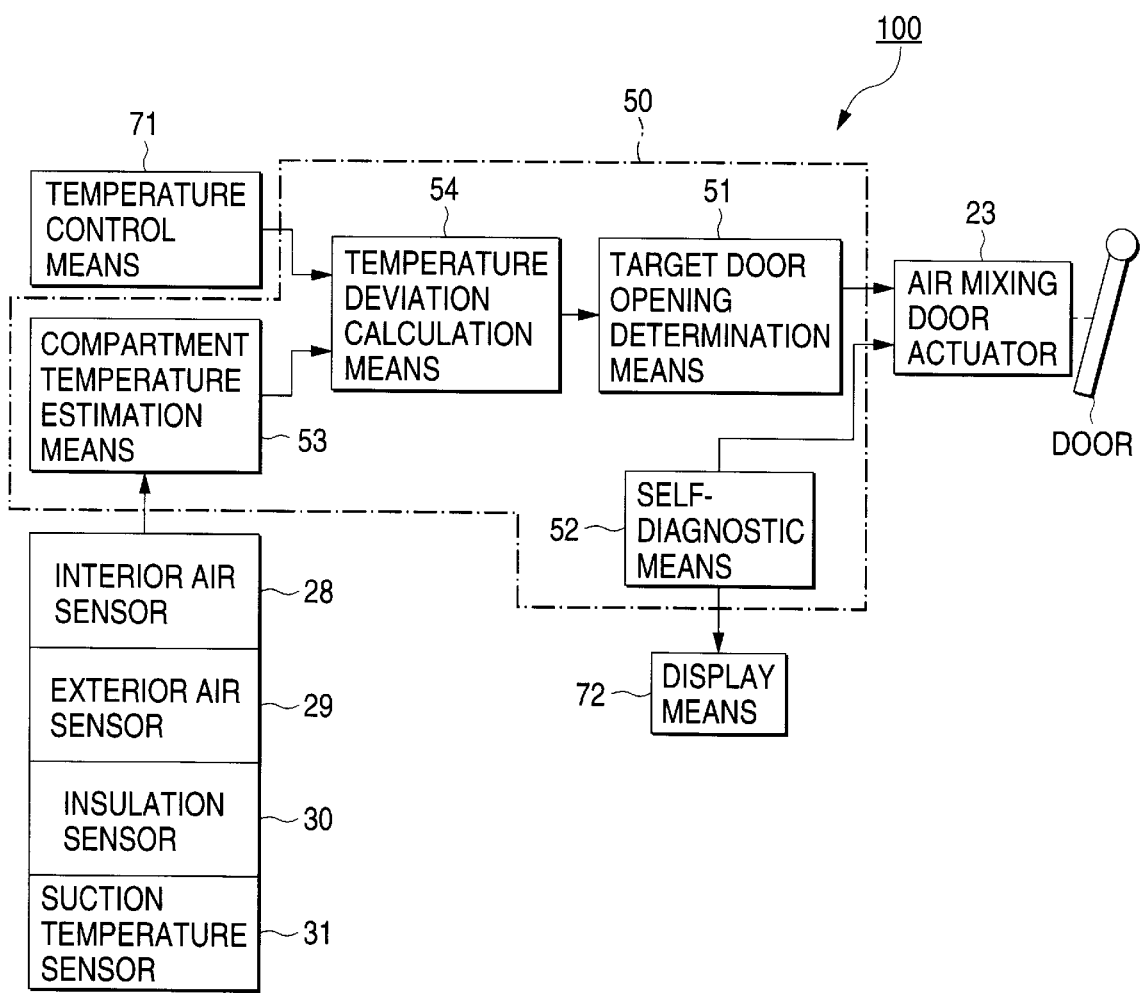
FIG. 21 is a block diagram showing an embodiment of the vehicle air-conditioning system according to the present invention.

Further, the detailed explanation of the previously-described air-conditioning amplifier unit 25 will be provided according to FIG. 21. As shown in FIG. 21, in the vehicle air-conditioning system 100 according to the present embodiment, the air-conditioning amplifier unit 25 comprises, as elements for controlling the mixing door 15, the compartment temperature estimation means 53 for estimating the temperature of the passenger compartment taking into consideration factors which would affect the compartment temperature; the temperature deviation calculation means 54 for calculating an deviation S between the temperature TPTC set by the temperature control lever 71 (provided in the operation section 32b) and the temperature of the passenger compartment estimated by the compartment temperature estimation means 53; and the target door opening determination means 51 which determines the direction ü/in which the mixing door 15 is actuatedü/on the basis of the temperature deviation S calculated by the temperature deviation calculation means 54 and determines a target door opening by adding a given degree of opening to a previously-determined target door opening or subtracting a given degree of opening from the previously-determined target door opening. All these means are constituted of electronic components, such as a CPU, ROM, RAM, or the like, included in the microcomputer.

If the passenger sets the compartment temperature TPTC by controlling the temperature control lever 71, the compartment temperature estimation means 53 estimates the temperature of the passenger compartment taking into consideration factors which would affect the compartment temperature. The "factors which would affect the compartment temperature" used herein designate factors having the possibility of affecting the temperature of the passenger compartment, such as the temperature of interior air, the exterior temperature, the amount of sunlight, and the suction temperature. More specifically, the interior temperature TINC detected by the interior air sensor 28, the exterior temperature Tam detected by the exterior air sensor 29, the amount of solar radiation amount QSUN detected by the insolation sensor 30, and the suction temperature Ti detected by the suction temperature sensor 31 are used as the factors which would affect the compartment temperature.

The temperature deviation calculation means 54 calculates the deviation S between the preset temperature TPTC and the temperature of the passenger compartment. The temperature deviation S signifies the degree of offset of the compartment temperature with reference to the present temperature. For example, in a case where the air mixing door actuator is controlled, the temperature deviation S is calculated by a thermal equilibrium equation comprising the preset temperature TPTC, the exterior temperature Tam, the interior temperature TINC, the suction temperature TINT, and the solar radiation amount QSUN. Although the thermal equilibrium equation is given by the following expression, the present invention is not particularly limited to this expression.

$$S=(A+D)TPTC+(B\cdot Eam-D\cdot ETINC)+C\cdot EQSUN+E+\alpha Xm-(F\cdot EX+G)(88-TINT)-TINT$$

where A, B, C, D, E, F, and G represent coefficients, TPTC represents a preset temperature, Tam represents the exterior temperature, TINC represents the interior temperature, QSUN represents the solar radiation amount, αXm represents a corrected deviation determined according to the currently-selected ventilation mode, X represents the degree of door opening, and TINT represents a suction temperature.

On the basis of the temperature deviation S, the target door opening determination means 51 determines the direction in which the mixing door 15 is actuated and a target door opening by adding a given degree of opening to the previously-determined target door opening or subtracting a given degree of opening from the same. The thus-determined target door opening is transmitted to the actuator 23.

Particularly, the vehicle air-conditioning system 100 according to the present embodiment further comprises the self-diagnostic means 52 (corresponding to j and k in the aforementioned embodiments). The self-diagnostic means 52 outputs to each of the door actuators 21 to 24 a diagnostic operation signal for actuating a door and diagnoses a problem of each door actuator by detecting the presence or absence of an operation signal (e.g., a high-level signal) and a stop signal (e.g., a low-level signal) output from the door actuator in response to the diagnostic operation signal. The self-diagnostic means 52 is incorporated into the microcomputer of the air-conditioning amplifier unit 25 in the form of a CPU, ROM, or RAM.

The operation of the vehicle air-conditioning system will be described.

Figure 23:
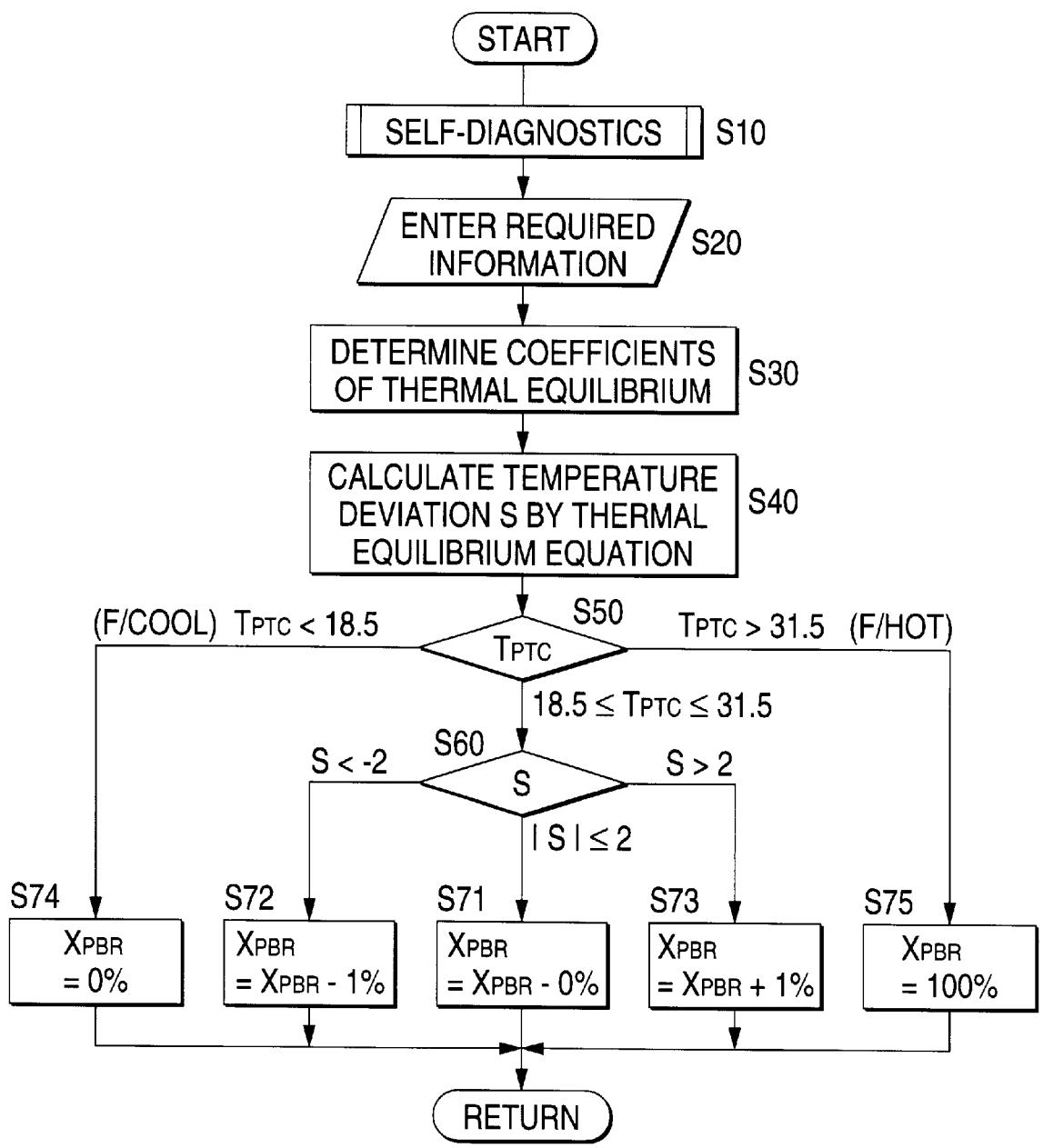
FIG. 23 is a flowchart showing an information processing procedure executed by the air-conditioning amplifier unit.
Figure 24:
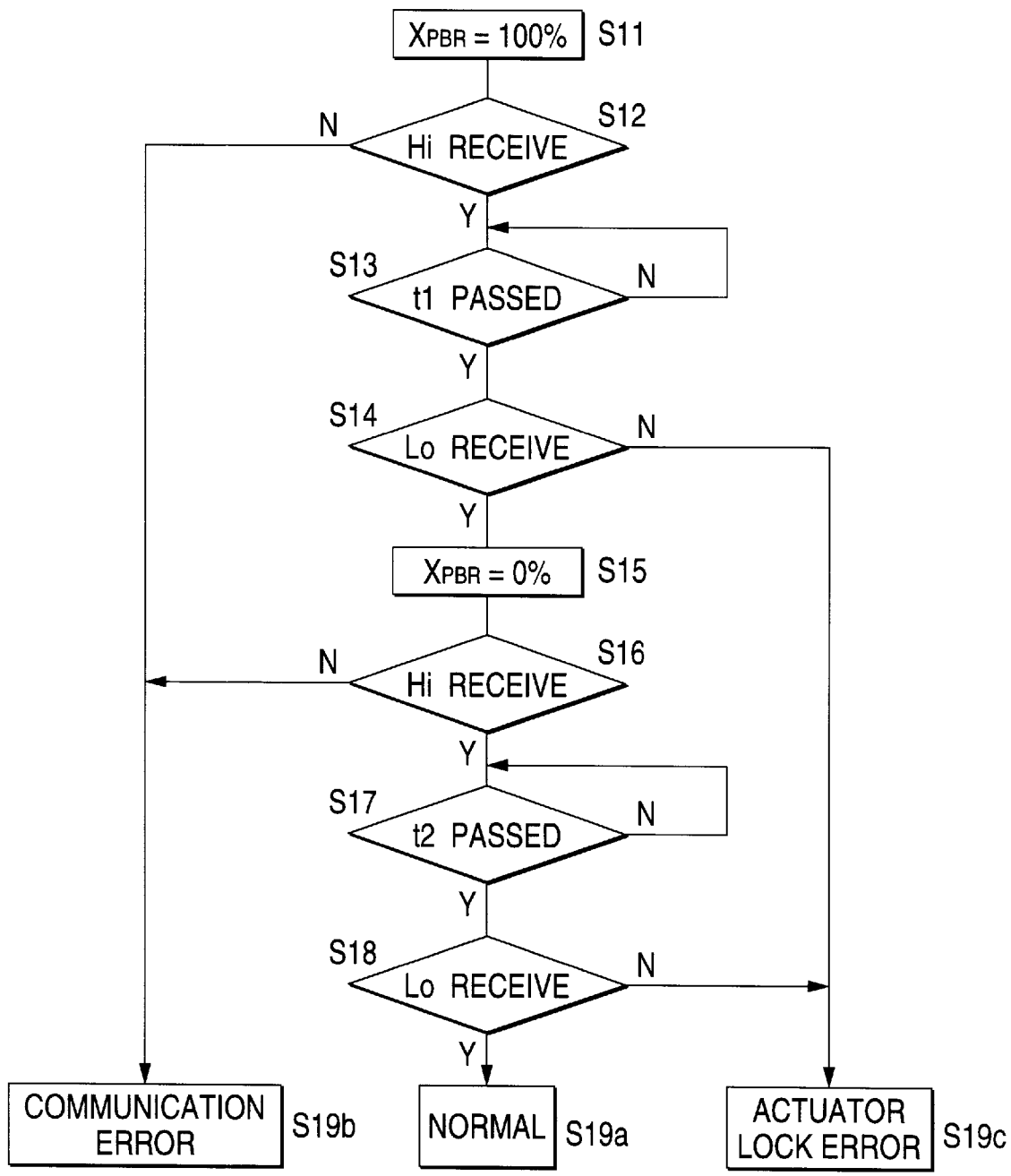
FIG. 24 is a flowchart showing a subroutine of self-diagnostic steps shown in FIG. 23.

FIG. 23 is a flowchart showing an information processing procedure executed by the air-conditioning amplifier unit 25 shown in FIG. 21. FIG. 24 is a flowchart showing a subroutine of a self-diagnostic step (step 10) shown in FIG. 23. The operation of the air-conditioning amplifier unit will be describe in reference to an example in which the mixing door is controlled.

First, the self-diagnostic procedure will be described.

For instance, if an air-conditioning switch is turned on, it is checked in step 10 whether or not there is an abnormality in the door actuators 21 to 24 of the vehicle air-conditioning system 100. In a self-diagnostic routine shown in FIG. 6, the self-diagnostic means 52 sends to the signal processing means of the air mixing door actuator 23 the target door opening signal (the diagnostic operation signal) XPBR for actuating the mixing door 15 to a full-open position. In this case, the full-open position of the mixing door 15 (i.e., XPBR=100%) represents a position where the mixing door 15 fully opens up the heater core 13. In contrast, the target door opening signals XPBR in steps 11 and 15 may be replaced with each other by setting the target door opening signal XPBR sent in step 11 to a signal for closing the mixing door 33 to a full-close position where the mixing door 15 fully closes the heater core 13, and by setting a fully-closing door opening signal described in step 15, which will be described later, to a fully-opening door opening signal.

If the fully-opening door opening signal XPBR is sent in step 11, the signal processing means 23c of the air mixing door actuator 23 sequentially acquires an opening X of the mixing door 15 actually detected by the potentiometer balance register 23b. An electrical current is applied to the motor 23a in such a way that the actual door opening X matches the target door opening XPBR. As a result, if the air-mixing door actuator 23 is normal, this air-mixing door actuator 23 actuates the door. Accordingly, a high-level signal is written as an operation signal into area POS of the communications frame format in FIG. 7 returned to the self-diagnostic means 52 from the air-mixing door actuator 23. The presence/absence of this high-level signal is determined in step 12.

If the self-diagnostic means 52 cannot check the high-level signal in step 12, the communications circuit provided between the air-conditioning amplifier unit 25 and the air mixing door actuator 23 is considered to be faulty. The processing proceeds to step 19b, and an indication "communications error" is displayed on the display panel 72 (provided in display 32a).

If the self-diagnostic means 52 can check the high-level signal from the air mixing door actuator 23 in step 12, the mixing door 15 is recognized to have started pivoting toward the full-open position. Therefore, in step 13, the self-diagnostic means 52 waits for only time period t1 required for the air mixing door 15 to arrive at the full-open position. This wait time t1 is usually set to tens of seconds.

In step 14, after the lapse of time period t1, the self-diagnostic means 52 checks the presence or absence of a low-level signal output as a stop signal from the air mixing door actuator 23. There may be a case where the high-level signal is received in step 12, but the low-level signal is not received in step 14. In this case, the operation signal is output in spite of the fact that the air mixing door 15 commences pivotal movement, and the time required for the air mixing door 15 to arrive at the full-open position has elapsed. For these reasons, the motor is thought to be in a motor-locked state. Consequently, the processing proceeds to step 19c, and an indication "actuator lock error" is displayed on the display panel 72.

The self-diagnostic means 52 can diagnose a problem of the actuator by execution of at least the processing described in steps 11 to 14. In this embodiment, the processing described in steps 15 to 18 is executed in order to improve the accuracy of trouble shooting.

In step 15, a target door opening signal (i.e., the diagnostic operation signal) XPBR for pivoting the mixing doors 15 to the full-close position opposite to the full-open position in step 11 is sent to the signal processing means 23c of the air mixing door actuator 23 from the self-diagnostic means 52. In this case, the full-open position of the mixing door 15 (XPBR=0%) signifies a position where the mixing door 15 fully closes the heater core 13.

If the fully-closing door opening signal XPBR is sent in step 15, the signal processing means 23c of the air mixing door actuator 23 sequentially acquires the opening X of the mixing door 15 actually detected by the potentiometer balance register 23b. An electrical current is applied to the motor 23a in such a way that the actual door opening X matches the target door opening XPBR. As a result, so long as the air mixing door actuator 23 is normal, this air mixing door actuator 23 commences the actuation of the door toward the full-close position. Accordingly, a high-level signal is written as an operation signal into area POS of the communications frame format returned to the self-diagnostic means 52. The self-diagnostic means 52 determines the presence or absence of this high-level signal.

If the self-diagnostic means 52 cannot check the high-level signal in step 16, the communications circuit provided between the air-conditioning amplifier unit 25 and the air-mixing door actuator 23 is considered to be faulty, as in step 12. The processing proceeds to step 19b, and an indication "communications error" is displayed on the display panel 72.

If the self-diagnostic means 52 can check the high-level signal from the air mixing door actuator 23 in step 16, the mixing door 15 is recognized to have started pivoting toward the full-close position. Therefore, in step 17, the self-diagnostic means 52 waits for only time period t2 required for the air mixing door 15 to arrive at the full-close position. This wait time t2 may be set so as to equal t1, but is usually set to tens of seconds.

In step 18, after the lapse of time period t2, the self-diagnostic means 52 checks the presence or absence of a low-level signal output as a stop signal from the air mixing door actuator 23. There may be a case where the high-level signal is received in step 16, but the low-level signal is not received in step 18. In this case, the operation signal is output in spite of the fact that the air mixing door 15 commences pivotal movement, and the time required for the air mixing door 15 to arrive at the full-open position has elapsed. For these reasons, the motor is thought to be in a motor-locked state. Consequently, the processing proceeds to step 19c, and an indication "actuator lock error" is displayed on the display panel 72.

If the self-diagnostic means 52 receives the low-level signal in step 18, the air mixing door actuator 23 is considered to be normal. An indication "normal" is then displayed on the display panel 72 in step 19a. As described above, the accuracy of trouble shooting can be improved by repeating in steps 15 to 18 the processing described in steps 12 to 14. Particularly, in a case where the mixing door 15 is coincidentally situated in a full-open position when the diagnostic operation signal is output in step 11, the mixing door 15 is maintained in that position, as is. Therefore, a risk may arise of failing to receive a high-level signal in step 12. Since such a problem can be prevented, it is desirable to add the processing described in steps 15 to 18 to the self-diagnostic procedure.

The foregoing self-diagnostic procedure is executed in an analogous manner with regard to the door actuators 21, 22, and 24, as well as the door actuator 23 for the mixing door 15. In the present embodiment, the actuators can be diagnosed through use of a conventionally-used amount of data; i.e., 1 bit of data, without use of the data designed specifically for diagnostics purpose.

After the completion of the previously-described self-diagnostics, the automatic control of the mixing door 15 described in steps subsequent to step 20 shown in FIG. 23 is commenced.

First, the data required to control the opening of the mixing door 15 are input from various types of sensors 28 to 31 and the operation section 32b in step 20. Before or after the entry of the data, the coefficients A to G used for the thermal equilibrium equation are determined in step 30. Strictly speaking, the coefficients F and G are determined in step 40.

The temperature deviation S is calculated through use of the thermal equilibrium equation in step 40. In calculating the temperature deviation S, a synthetic temperature W is calculated from the exterior temperature Tam, the interior temperature TINC, and the coefficients B and D by the expression W=B·am+D·ETINC. Next, the door opening X is calculated from the target door opening XPBR obtained as a result of the previous arithmetic processing. Further, the corrected deviation αXm is determined according to the currently-selected ventilation mode. The coefficients F and G are determined by the door opening X and the ventilation mode (e.g., a ventilation mode, a defroster mode, a bi-level 2 mode, or others).

Finally, the thus-determined values are substituted into the foregoing thermal equilibrium equation, thereby calculating the temperature deviation S between the preset temperature and the compartment temperature.

In step 50, a decision is made as to whether the temperature TPTC set by the control panel 70 is in a full-cool range under 18.5° C. a full-hot range over 31.5° C., or a conditioned range between 18.5° C. and 31.5° C. In this case, the boundaries of the conditioned range; i.e., 18.5° C. and 31.5° C., are provided as illustrative but not as restrictive.

If the preset temperature TPTC is in the full-cool range below 18.5° C., the target door opening is set to XPBR=0%, and the mixing door 15 is pivoted to the heater core full-close position (step 74). In contrast, if the preset temperature TPTC is in the full-hot range above 31.5° C., the target door opening is set to XPBR=100%. The mixing door 15 is pivoted to the heater core full-open position (step 75).

Further, if the preset temperature TPTC is in the conditioned range between 18.5° C. and 31.5° C. in step 50, a decision is made in step 60 as to whether the absolute value |S| of the temperature deviation S is smaller or larger than 2. In a case where the absolute value |S| of the temperature deviation is smaller than 2, the processing will proceed to step 71. The target door opening XPBR is set so as to equal the previous target door opening; i.e., XPBR=XPBR+0%.

If the temperature deviation S is below −2 in step 60, the processing proceeds to step 72. The target door opening XPBR is reduced by 1% with reference to the previous target door opening; i.e., the door opening is set to XPBR=XPBR−1%.In contrast, if the temperature deviation S is greater than 2 in step 60, the processing proceeds to step 73. The target door opening XPBR is increased by 1% with reference to the previous target door opening; i.e., the door opening is set to XPBR=XPBR+1%.

Figure 20:
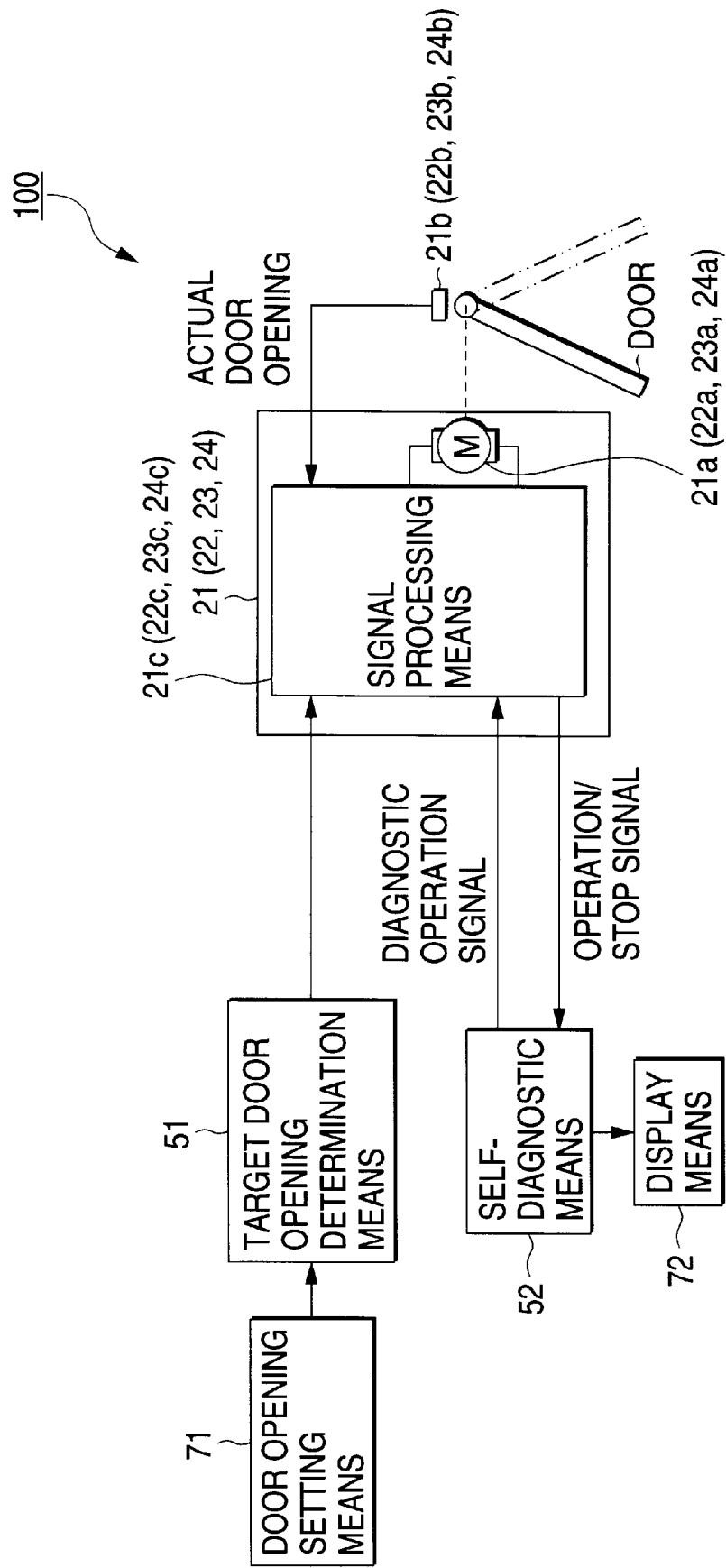
FIG. 20 is a block diagram showing a vehicle air-conditioning system according to the present invention.

The aforementioned embodiment is provided for the purpose of easy understanding of the present invention and is not intended to be restrictive. Consequently, the elements disclosed in the foregoing embodiment are all subjected to engineering change and comprise equivalents fallen into the technical scope of the present invention. For example, the control flow for the mixing door 15 may be realized by means of a method other than that employed in the embodiment and is not directly relevant to the diagnostics according to the present invention shown in FIGS. 20 and 24.

According to the present invention, there is provided a self-diagnostic apparatus for diagnosing the operations of doors in a vehicle air-conditioning system which controllably actuates a plurality of door actuators, the improvement comprising: an air-conditioning amplifier unit being connected to a plurality of door actuators by means of one communication and one power line; and first door-operation self-diagnostic means which sends to the door actuator target stopping position data for bringing doors in a full-open condition or full-close condition; if there is a change in an instruction value, after the lapse of a preset time period which takes into account the time period required for the door to arrive at a target position and a lag in communication, the self-diagnostic means determining that the doors are in a normal condition when the signal returned from the door actuator represents that the doors are in a stopped state but determining that the doors are in an abnormal condition when the signal represents that the doors are in an actuated state. As a result, it is possible to provide a door-operation self-diagnostic apparatus which ensures the reduction in the weight and cost of the air-conditioning system by connecting, in the form of a LAN, the air-conditioning amplifier to the door actuators; and which correctly determines whether or not the doors are in a normal state or an abnormal state by means of a return signal which represents a change in the instruction value to actuate the door to the full-open or full-close position and the stop and actuation of the door.

The doors to be subjected to self-diagnostics by the first door-operation self-diagnostic means are actuated at least between two conditions; i.e., a full-open state and a full-close state; and the first door-operation self-diagnostic means determines whether the doors are actuated normally or abnormally with regard to each of the full-open state and the full-close state. Accordingly, in each of the closing and opening directions, it is possible to determine whether the doors are actuated normally or abnormally.

Further, there is provided a self-diagnostic apparatus for diagnosing the operations of doors in a vehicle air-conditioning system which controllably actuates a plurality of door actuators, the improvement being characterized by comprising: an air-conditioning amplifier unit being connected to a plurality of door actuators by means of one communication and one power line; and second door-operation self-diagnostic means which sends an instruction for sequentially changing a mode in the order in which the door actuator stops at intermediate stopping positions; in an initial mode, the second door-operation self-diagnostic means waiting for the lapse of a first long preset time period which takes into account the time period required for the door received an instruction value to arrive at a target position and a lag in communication; in the modes subsequent to the initial mode, the second door-operation self-diagnostic means waiting for the lapse of a second short preset time period which takes into account the time period required for the door to arrive at the adjacent intermediate position and a lag in communication; the second door-operation self-diagnostic means determining that the door is in a normal condition when the signal returned from the door actuator represents that the door is in a stopped state but determining that the door is in an abnormal condition when the signal represents that the door is in an actuated state. As a result, it is possible to provide a door-operation self-diagnostic apparatus which ensures the reduction in the weight and cost of the air-conditioning system by connecting, in the form of a LAN, the air-conditioning amplifier to the door actuators; and which, in a comparatively short period of time, correctly determines whether or not the door is in a normal state or an abnormal state by means of a return signal which represents a change in the stopping position of the door actuator and the stop and actuation of the door.

The door to be subjected to self-diagnostics is a mode actuator which stops at intermediate stopping positions corresponding to a plurality of modes between a ventilation mode and a defroster mode; and the second door-operation self-diagnostic means is arranged so as to perform second checking operation of sequentially changing modes in the reverse direction after the completion of first checking operation of sequentially changing the modes. Accordingly, in each of the directions of forward and reverse actuation, it is possible to determine whether the door is actuated normally or abnormally.

There is provided a device for determining errors in communication in a vehicle air-conditioning system which controllably actuates a plurality of door actuators, the improvement comprising an air-conditioning amplifier unit being connected to a plurality of door actuators by means of one communication line and one power line; a communications frame format which sequentially sends an instruction value, such as target door stopping position data, to each of the door actuators from the air-conditioning amplifier unit via the communication, the data to be transmitted included in the format being additionally provided with a return signal which represents the actuation of the door actuators when the signal is in a high state but represents the stop of the door actuators when the signal is in a low state; the air-conditioning amplifier unit having self-diagnostics means which changes the instruction value sent to the door actuators from the air-conditioning amplifier unit and checks the signals returned from the actuators after the lapse of delay time; if the return signals are in a low state, the self-diagnostics means determining the actuators to be in a normal state; but if the return signals are in a high state, the self-diagnostics means determining the actuators to be in an abnormal state; and the air-conditioning amplifier unit having first communications error determination means; the first communications error determination means comparing the data which the air-conditioning amplifier unit output with the data received by the air-conditioning amplifier unit; if the received data corresponding to the transmitted data in a high state are in a low state, the first communications error determination means determining that there is an error in communication due to grounded short circuit. As a result, there is provided an advantage of being able to provide a communications error determination device capable of ensuring the reduction in the weight and cost of an air-conditioning system by connecting, in the form of a LAN, the air-conditioning amplifier to the door actuators, as well as of correctly determining a communications error if there is a grounded short circuit in the communication.

In the above device, the air-conditioning amplifier unit has second communications error determination means in place of the first communications error determination means, and the second communications error determination means commences the checking of the return signals at the point in time when the instruction value sent to the door actuators from the air-conditioning amplifier unit is changed and, if the return signals do not go high but still remain in a low state even after the lapse of a preset period of time, determines that there is an error in communication due to grounded short circuit. As a result, there is provided an advantage of being able to provide a communications error determination device capable of ensuring the reduction in the weight and cost of an air-conditioning system by connecting, in the form of a LAN, the air-conditioning amplifier to the door actuators, as well as of correctly determining a communications error if there is a grounded short circuit in the communication.

Further, as described above, by virtue of the present invention, it is possible even for a local-area-networked vehicle air-conditioning system to diagnose a problem of an actuator through use of a small amount of data without use of the data designed specifically for diagnostics purpose.

What is claimed is:

1. A vehicle air-conditioning system comprising:

a door actuator for driving a door; and an air-conditioning amplifier unit being connected to said door actuator through one communication line and one power line, said air-conditioning amplifier unit arithmetically processing input signals received from outer equipments provided in a vehicle;

wherein said air-conditioning amplifier unit sends a target stopping position data for bringing the door in a full-open condition or full-close condition to said door actuator, and when the target stopping position data is changed, said air-conditioning amplifier unit waits lapse of a preset time period which takes into account time period required for the door to arrive at a target position and a lag in communication, and said air-conditioning amplifier unit determines that:

(i) the door is in a normal condition when the signal returned from said door actuator represents that the door is in a stopped state, and determines that:

(ii) the door is in an abnormal condition when the signal represents that the door is in an actuated state.

2. The vehicle air-conditioning system according to claim 1, wherein the doors are actuated at least between two conditions including a full-open state and a full-close state, and said air-conditioning amplifier unit determines whether the doors are actuated normally or abnormally with regard to each of the full-open state and the full-close state.

3. A vehicle air-conditioning system comprising:

a door actuator for driving a door; and an air-conditioning amplifier unit being connected to said door actuator through one communication line and one power line, said air-conditioning amplifier unit arithmetically processing input signals received from outer equipments provided in a vehicle;

wherein said air-conditioning amplifier unit sends an instruction for sequentially changing a mode in an order in which said door actuator stops at intermediate stopping positions, and (A) in initial mode, said air-conditioning amplifier unit waits for lapse of a first long preset time period which takes into account time period required for the door received the instruction value to arrive at a target position and a lag in communication, and (B) in the modes subsequent to the initial mode, said air-conditioning amplifier unit waits for lapse of a second short preset time period which takes into account the time period required for the door to arrive at the adjacent intermediate position and a lag in communication, and said air-conditioning amplifier unit determines that:

(i) the door is in a normal condition when the signal returned from said door actuator represents that the door is in a stopped state, and determines that:

(ii) the door is in an abnormal condition when the signal represents that the door is in an actuated state.

4. The vehicle air-conditioning system according to claim 3, wherein said door actuator is a mode actuator which stops at intermediate stopping positions corresponding to a plurality of modes between a ventilation mode and a defroster mode, and said air-conditioning amplifier unit is arranged so as to perform second checking operation of sequentially changing modes in a reverse direction after completion of first checking operation of sequentially changing the modes.

5. A vehicle air-conditioning system comprising:

a door actuator for driving a door; and an air-conditioning amplifier unit being connected to said door actuator through one communication line and one power line, said air-conditioning amplifier unit arithmetically processing input signals received from outer equipments provided in a vehicle and communicating with said door actuator by a communication signal including (i) an output signal sent to said door actuator and (ii) a return signal which represents an actuation of said door actuator when the return signal is in a high state but represents a stop of said door actuator when the return signal is in a low state;

wherein said air-conditioning amplifier unit compares data in the output signal with data in the return signal, and when said air-conditioning amplifier unit receives the return signal with a low state, said air-conditioning amplifier unit determines that there is an error in communication due to grounded short circuit.

6. A vehicle air-conditioning system comprising:

a door actuator for driving a plurality of doors; and an air-conditioning amplifier unit being connected to said door actuator through one communication line and one power line, said air-conditioning amplifier unit arithmetically processing input signals received from outer equipments provided in a vehicle and communicating with said door actuator by a communication signal including (i) an output signal sent to said door actuator and (ii) a return signal which represents an actuation of said door actuator when the return signal is in a high state but represents a stop of said door actuator when the return signal is in a low state;

wherein said air-conditioning amplifier unit commences checking of the return signal at the point in time when an instruction value sent to said door actuator from said air-conditioning amplifier unit is changed and, if the return signal do not go high but still remain in a low state even after a lapse of a preset period of time, said air-conditioning amplifier unit determines that there is an error in communication due to grounded short circuit.

7. A vehicle air-conditioning system comprising:

a door actuator for driving a door; and an air-conditioning amplifier unit being connected to said door actuator through one communication line and one power line, said air-conditioning amplifier unit arithmetically processing input signals received from outer equipments provided in a vehicle;

wherein said air-conditioning amplifier unit outputs to said door actuator a diagnostic operation signal for actuating the door and diagnoses a problem in said door actuator on the basis of presence or absence of operation and stop signals received from said door actuator in response to the diagnostic operation signal.

8. The vehicle air-conditioning system according to claim 7, wherein said air-conditioning amplifier unit outputs to said door actuator the diagnostic operation signal for actuating the door in one direction, and said air-conditioning amplifier unit:

(A) determines said door actuator to be normal when said air-conditioning amplifier unit receives the operation signal from said door actuator in response to the diagnostic operation signal and further receives the stop signal from said door actuator after lapse of a given period of time;

(B) determines said door actuator to be in a motor-locked state when said air-conditioning amplifier unit receives the operation signal from said door actuator in response to the diagnostic operation signal but fails to receive the stop signal from said door actuator even after the lapse of a given period of time; and (C) determines said door actuator to be in an abnormal communication state when said air-conditioning amplifier unit fails to receive the stop signal from said door actuator in response to the diagnostic operation signal.

9. The vehicle air-conditioning system according to claim 7, wherein said air-conditioning amplifier unit outputs to said door actuator a first diagnostic operation signal for actuating the door in one direction and then outputs to said door actuator a second diagnostic operation signal for actuating the door in the other direction, and said air-conditioning amplifier unit:

(A) determines said door actuator is normal when said air-conditioning amplifier unit receives the operation signal from said door actuator in response to the first diagnostic operation signal, receives the stop signal from said door actuator after the lapse of a given period of time, receives the operation signal from the actuator in response to the second diagnostic operation signal, and receives the stop signal from the actuator after the lapse of a given period of time;

(B) determines said door actuator to be in a motor-locked state when said air-conditioning amplifier unit receives the operation signal from the actuator in response to the first diagnostic operation signal but fails to receive the stop signal from said door actuator even after the lapse of a given period of time, or when said air-conditioning amplifier unit receives the operation signal from said door actuator in response to the second diagnostic operation signal but fails to receive the stop signal from said door actuator even after the lapse of a given period of time; and (C) determines said door actuator to be in an abnormal communication state when said air-conditioning amplifier unit fails to receive the operation signal from said door actuator in response to the first diagnostic operation signal, or when said air-conditioning amplifier unit fails to receive the operation signal from said door actuator in response to the second diagnostic operation signal.

10. The vehicle air-conditioning system according to claim 7, further comprising display means for displaying a result of diagnostics by said air-conditioning amplifier unit.

11. The vehicle air-conditioning system according to claim 8, further comprising display means for displaying a result of diagnostics by said air-conditioning amplifier unit.

12. The vehicle air-conditioning system according to claim 9, further comprising display means for displaying a result of diagnostics by said air-conditioning amplifier unit.

* * * * *